(12) United States Patent
Patsiokas et al.

(10) Patent No.: US 8,005,419 B2
(45) Date of Patent: Aug. 23, 2011

(54) SYSTEM AND METHOD FOR SECURELY STORING AND ORGANIZING SDARS CONTENT WITH DRM AND NON-DRM PROTECTED MEDIA CONTENT, AND FOR FACILITATING OBTAINING PURCHASED OR SUBSCRIPTION-BASED MEDIA BASED ON RECEIVED SDARS CONTENT

(75) Inventors: Stelios Patsiokas, Coral Springs, FL (US); Paul D. Marko, Pembroke Pines, FL (US); Gary Morse, Boca Raton, FL (US)

(73) Assignee: XM Satellite Radio Inc., Washington, DC (US)

( * ) Notice: Subject to any disclaimer, the term of this patent is extended or adjusted under 35 U.S.C. 154(b) by 972 days.

(21) Appl. No.: 11/647,572

(22) Filed: Dec. 29, 2006

(65) Prior Publication Data

US 2008/0162358 A1   Jul. 3, 2008

(51) Int. Cl.
*H04H 1/00* (2006.01)
(52) U.S. Cl. ............... 455/3.02; 455/3.06; 455/186.1; 705/57; 386/70
(58) Field of Classification Search ............... 455/2.01, 455/3.01, 3.02, 3.04, 3.06, 12.1, 13.2, 552.1, 455/553.1, 556.1, 154.2, 186.1, 230, 552, 455/425, 414.1, 569.2, 90.1, 427; 705/57, 705/205; 725/134, 142, 87, 91; 345/98; 713/171, 160, 161, 165, 201; 386/70, 125
See application file for complete search history.

(56) References Cited

U.S. PATENT DOCUMENTS

| | | | |
|---|---|---|---|
| 5,721,827 A | 2/1998 | Logan et al. | 395/200.47 |
| 5,822,737 A | 10/1998 | Ogram | 705/26 |
| 5,883,957 A * | 3/1999 | Moline et al. | 705/57 |
| 5,892,536 A | 4/1999 | Logan et al. | 348/13 |
| 5,963,917 A | 10/1999 | Ogram | 705/26 |
| 5,986,692 A | 11/1999 | Logan et al. | 348/13 |
| 6,088,455 A | 7/2000 | Logan et al. | 380/200 |
| RE36,801 E | 8/2000 | Logan et al. | 348/571 |
| 6,154,452 A * | 11/2000 | Marko et al. | 370/321 |
| 6,229,824 B1 | 5/2001 | Marko | 370/477 |
| 6,233,389 B1 | 5/2001 | Barton et al. | 386/46 |
| 6,247,130 B1 * | 6/2001 | Fritsch | 713/171 |
| 6,381,584 B1 | 4/2002 | Ogram | 705/26 |
| 6,510,317 B1 * | 1/2003 | Marko et al. | 455/428 |
| 6,553,077 B2 | 4/2003 | Rindsberg et al. | 375/260 |
| 6,564,003 B2 * | 5/2003 | Marko et al. | 386/69 |
| 6,608,399 B2 | 8/2003 | McConnell et al. | 307/10.1 |
| 6,628,928 B1 | 9/2003 | Crosby et al. | 455/77 |
| 6,629,197 B1 | 9/2003 | Bhogal et al. | 711/111 |
| 6,631,271 B1 | 10/2003 | Logan | 455/456 |
| 6,665,659 B1 | 12/2003 | Logan | 707/3 |

(Continued)

*Primary Examiner* — Tan Trinh
(74) *Attorney, Agent, or Firm* — Roylance, Abrams, Berdo & Goodman, LLP

(57) ABSTRACT

Disclosed are a device and method for securely storing and organizing SDARS content on a portable player. SDARS audio content is stored on a private partition of the device not available to a client PC. Shadow files are stored on a public partition of the device. The shadow files contain metadata related to the corresponding SDARS audio and a reference to the SDARS audio on the private partition. Playlists can be organized on the device intermixing stored SDARS content with DRM and non-DRM protected media content. Downloading of purchased or subscription-based media files based on observed or received SDARS content is facilitated. Digital Rights Management features are included to control authorized actions with respect to SDARS content. Firmware updates are performed using encrypted firmware unique to the particular device to thwart firmware hacking.

62 Claims, 26 Drawing Sheets

U.S. PATENT DOCUMENTS

| | | | |
|---|---|---|---|
| 6,678,215 B1 | 1/2004 | Treyz et al. | 368/10 |
| 6,681,176 B2 | 1/2004 | Funk et al. | 701/207 |
| 6,697,944 B1 | 2/2004 | Jones et al. | 713/168 |
| 6,904,264 B1 | 6/2005 | Frantz | 455/3.04 |
| 7,366,246 B2 * | 4/2008 | Walker et al. | 375/262 |
| 2002/0071658 A1 * | 6/2002 | Marko et al. | 386/70 |
| 2002/0132575 A1 * | 9/2002 | Kesling et al. | 455/2.01 |
| 2003/0014767 A1 | 1/2003 | Stumphauzer, II | 725/131 |
| 2003/0093790 A1 * | 5/2003 | Logan et al. | 725/38 |
| 2003/0110057 A1 | 6/2003 | Pisz | 705/1 |
| 2003/0135464 A1 | 7/2003 | Mourad et al. | 705/50 |
| 2004/0058641 A1 * | 3/2004 | Acker | 455/3.02 |
| 2005/0012563 A1 * | 1/2005 | Kramer | 333/125 |
| 2005/0172154 A1 * | 8/2005 | Short et al. | 713/201 |
| 2006/0040609 A1 * | 2/2006 | Petschke et al. | 455/3.02 |
| 2006/0047957 A1 * | 3/2006 | Helms et al. | 713/165 |
| 2007/0222734 A1 * | 9/2007 | Tran | 345/98 |
| 2008/0095230 A1 * | 4/2008 | Hannuksela et al. | 375/240.02 |
| 2008/0176510 A1 * | 7/2008 | Yuhara et al. | 455/3.02 |
| 2008/0215645 A1 * | 9/2008 | Kindig et al. | 707/205 |

* cited by examiner

| Field | Tag | Length | Values | | |
|---|---|---|---|---|---|
| Device Model | 0x01 | 2 | Major/Minor [2] BYTE | | |
| Device Hardware Version | 0x02 | v | STRING | | |
| Device Firmware Version | 0x03 | v | STRING | | |
| Device Serial Number | 0x04 | 4 | From microcontroller manufacturer | | |
| Radio ID | 0x05 | 8 | XM Radio ID [8] BYTE | | |
| Subscription Status | 0x06 | 1 | ENABLE/DISABLE BYTE | 0/1 | |
| Premium Service Status | 0x07 | 1 | ENABLE/DISABLE BYTE | 0/1 | |
| Private Content Partition | 0x08 | 8 | Total | UINT32 | Bytes |
| | | | Locked | UINT32 | Bytes |
| Public Content Partition | 0x09 | 4 | Total | UINT32 | Bytes |
| Data Exchange Partition | 0x0A | 4 | Total | UINT32 | Bytes |
| Continous Partitioning Allowed | 0x0B | 1 | TRUE/FALSE BYTE | 0/1 | |
| Number of Discrete Partitions | 0x0C | 1 | 0-255 BYTE | | |
| Private Partition Reserve | 0x0D | 1 | Percentage BYTE | (0-100) | |
| Media Content - Audio | 0x0E | 6 | Media type ENUM | (MP3, WMA, WAV, XMM, _) | |
| | | | Bitrate UINT32 | 0-0xffffffff Kbps | |
| | | | VBR BYTE | (1/0) | |
| Media Content - Image | 0x0F | 7 | Media type ENUM | (JPG, GIF, PNG, TIFF, RAW, BMP) | |
| | | | Resolution UINT16 | x 2 (H x W) | |
| | | | Color depth UINT32 | | |
| DRM Support | 0x10 | 1 | DRM support ENUM | (None, PDDRM, Janus) | |
| Friendly Name | 0x11 | v | Name STRING | Max 32 chars + 0 terminator | |
| Time Zone | 0x12 | 2 | Offset Hours BYTE | | |
| | | | DST BYTE | 0/1 | |
| Supported Playlists | 0x15 | 1 | Playlist Format ENUM | (M3U, WPL, ASX, XMIL, XSPF, _) | |
| Diagnostics | 0x16 | 1 | Diagnostics [8] BYTE | | |

FIG. 4

AS BROADCAST:

AS RECORDED:

SYSTEM AND METHOD FOR SECURELY STORING AND ORGANIZING SDARS CONTENT WITH DRM AND NON-DRM PROTECTED MEDIA CONTENT, AND FOR FACILITATING OBTAINING PURCHASED OR SUBSCRIPTION-BASED MEDIA BASED ON RECEIVED SDARS CONTENT

FIELD OF THE INVENTION

The present invention relates generally to satellite digital audio broadcast radio service (SDARS) and portable music players. In particular, the present invention relates to a system and method for storing protected SDARS content on a portable player, and organizing the same in playlists along with digital nights management (DRM) protected media and non-DRM protected media.

BACKGROUND OF THE INVENTION

Recently there has been increased interest in delivering media content, such as music, to consumers in new ways. For example, online music stores have enabled consumers to purchase music tracks one song or one album at a time. A Digital Rights Management (DRM) digital version of the song is transferred to the consumer, typically over a broadband internet connection, for playback on the consumer's computer or another authorized device such as a portable playback device. One problem with this business model is that consumers are typically only able to sample 30 second sound bites of songs before purchasing. Also, consumers are typically required to know what music they are interested in before they can search for and purchase the music. In other words, this business model is a "pull" system, where the consumer requests the particular song or media file that they want. Client software may make recommendations to consumers to introduce them to new content, but these features are typically rather limited. Furthermore, spontaneously generated broadcast content, such as terrestrial or satellite radio broadcasts, is often more effective at introducing consumers to new music and/or reminding consumers of music they would like to purchase. However, in most cases the consumer is required to remember what they heard on the radio, and search for the desired content the next time they are at a computer.

Another business model works on a subscription basis. Consumers typically pay a monthly subscription, and are entitled to download an unlimited number of DRM-protected songs from a particular vendor's library of media content. These subscription-based songs, however, are typically only playable on the consumer's PC or other authorized device so long as the consumer maintains their subscription. Also, the consumer is typically more limited in what they can do with media content obtained via their subscription. For example, while the subscription holder can normally download an unlimited number of songs, if they want to burn music to a standard CD, they are required to separately purchase the songs they want to burn. Also, the subscription model is a "pull" model, and is subject to the same problems described above with respect to inadequate means to identify new content for download.

More recently, satellite digital audio radio service (SDARS) systems have been introduced to provide consumers with a new way of enjoying music. In an SDARS system, over 100 channels of music, news and other content are streamed via satellite or terrestrial repeater to consumer receivers. The consumers are typically required to maintain a subscription to the SDARS service to receive the SDARS broadcast. Due to the number of channels and the variety of genres available on SDARS systems, consumers have rapidly adopted these services. More recently, personal portable players have been introduced that allow the consumer to use their SDARS receiver in their car, in their home, or even to carry the receiver with them.

There are some known limitations with existing SDARS systems and for-purchase and subscription-based download music services. SDARS portable players have had some capacity to buffer SDARS content in a first-in-first-out (FIFO) manner, and to remember names of artists and/or song titles to assist with later purchase from an online music service. However, by design, such devices have limited the ability of the consumer to permanently save and organize SDARS content. The portable players have a limited capacity for storing SDARS content (such as, for example, five hours of content). The content is typically overwritten in a FIFO manner, unless a particular portion is "locked." However, locked content reduces the amount of memory remaining for new content to be stored. The FIFO buffer of existing players is mainly intended to be used as a time-shifting device, rather than a permanent storage for music "owned" by the consumer. SDARS devices, by design, do not permit the consumer to transfer stored SDARS content from the portable player to another device. In addition, the stored SDARS content only remains playable while the consumer maintains their subscription with the SDARS service.

Furthermore, if the consumer desires to use both an SDARS system and a digital media player to enjoy their purchased or subscription-based downloaded music, two separate devices are required.

Accordingly, there is a need for a portable SDARS receiver that facilitates the identification and download of purchased or subscription-based media files. Furthermore, there is a need for a more sophisticated manner of interacting with stored SDARS content on a portable player while still preventing the consumer from removing the SDARS content from the device, or otherwise using the stored SDARS content in an unauthorized manner. There is a need for a single portable device, which allows the consumer to store both SDARS content and downloaded purchased or subscription-based music, and to organize playlists comprising both SDARS content and DRM or non-DRM protected media files.

SUMMARY OF THE INVENTION

The above and other problems are overcome, and additional advantages are realized by exemplary embodiments of the present invention. A system according to an exemplary embodiment of the present invention comprises a portable SDARS player that is connectable to a personal computer (PC) having client software that is adapted to interact with the portable SDARS player and an online media service, such as a music purchase service or a subscription download service. The portable SDARS player is capable of storing SDARS content in private memory that is not accessible outside the portable SDARS receiver, and makes the stored SDARS content available to the client software via shadow files that represent individual segments of the stored SDARS content and that reside in a public memory in the player that is accessible by the PC via the client software. The shadow files preferably contain metadata representing the content of the stored SDARS segments to which they pertain, as well as a reference to the particular SDARS segment stored in the private memory.

The client software is preferably capable of matching stored SDARS content to media files available from the online media service in order to facilitate obtaining authorized purchased or subscription-based versions of media files corresponding to the stored SDARS content. The matching preferably occurs via the metadata contained in shadow files. The metadata preferably includes artist name, album name, and song title information, and also can include program ID, data and time of transmission, among other things.

The client software is preferably capable of arranging playlists on the portable SDARS player comprising references to DRM and/or non-DRM protected media files stored in the public memory, as well as references to stored SDARS segments via shadow files. In this manner, the portable SDARS player can play back a playlist comprising DRM and/or non-DRM protected media files intermixed with stored SDARS segments, so long as the user remains authorized to access the SDARS content and any DRM protected media files in the playlist.

BRIEF DESCRIPTION OF THE DRAWINGS

The invention will be more readily understood with reference to the exemplary embodiments thereof illustrated in the attached drawing figures, in which:

FIG. 4 illustrates an exemplary Device Profile file stored in a device according to an exemplary embodiment of the present invention;

Throughout the drawing figures, like reference numbers will be understood to refer to like elements, features and structures.

DETAILED DESCRIPTION OF EXEMPLARY EMBODIMENTS

Figure 1:
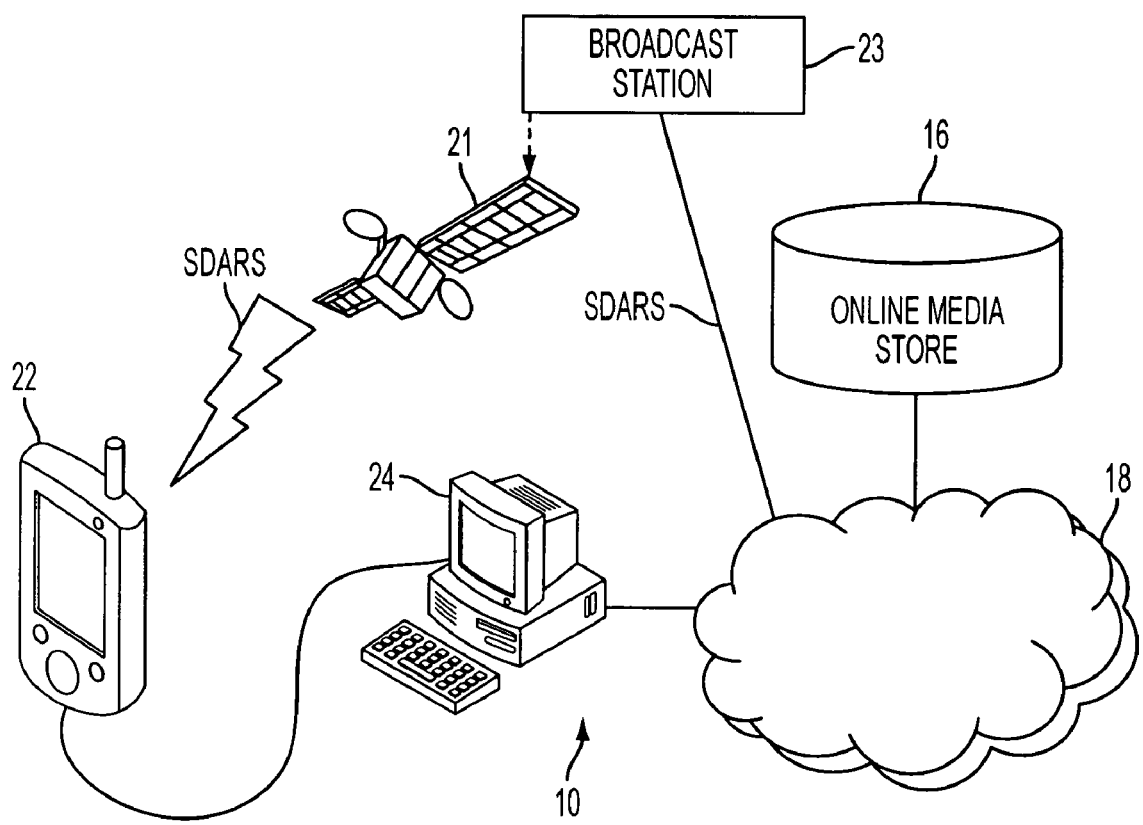
FIG. 1 illustrates a system according to an exemplary embodiment of the present invention, including a portable player, client PC, online media store and SDARS service.

Exemplary embodiments of the invention will now be described with reference to the attached drawing figures. FIG. 1 shows a system 10 according to an exemplary embodiment of the present invention. The system comprises a portable SDARS player 22 connected to a client personal computer (PC) 24 that hosts client software for interacting with the SDARS player 22. The SDARS player receives SDARS service 20 provided via a broadcast station that can transmit SDARS via a wired network and wirelessly (e.g., from satellites 21 or terrestrial repeaters). For illustrative purposes, the SDARS service 20 is represented as broadcast via a satellite 21 or via as wired network from an SDARS broadcast station 23 in FIG. 1. The PC 24 with client software also connects to an online media store 16 via the internet 18 to obtain desired media content for the user.

The interface operations of SDARS capable audio players (hereinafter "Devices") 22 will now be described which enable such Devices to be supported by the client PC software. Devices that support these interface operations, and therefore gain compatibility with the client software, advantageously provide all the users of the Device benefits associated with the capabilities of the client PC software, which include the following functions, among others:

Manage Device Content
Manage Device Playlists
Purchase/Download/Explore music based on captured SDARS Content
Manage Device Recording Options More specifically, the client software adds the following capabilities to a Device 22:

1. Creating and organizing Device playlists, including adding SDARS, MP3, and WMA tracks currently stored on the Device and in PC storage to the playlists. It should be understood that while "MP3" and "WMA" are used as representative encoding types for audio files, any suitable encoding technique is considered to be within the scope of this invention, including in particular, but not exclusively, AAC, AAC+, AMBE, OGG, and others. The encoding types can include non-DRM protected types, as well as DRM protected types.
2. Marking SDARS content on the Device as locked or unlocked.
3. Linking the user to the online music library to explore "bookmarked" tracks for potential download.
4. Scheduling Device recording sessions.
5. Performing other Device content management and housekeeping functions from the PC interface.

Architecture

In accordance with an exemplary embodiment of the present invention, the following components and specifications are involved in PC24/Device 22 connectivity:

Client—The Client music management application, customized for SDARS device connectivity.
XMPDlib—Software library providing an interface between the Client and an SDARS Device.
XMPDlib API—Application Programming Interface used by the Client to access XMPDlib services.
PD/Device Data Exchange—Definition of device files and policies used by XMPDlib to exchange data between the PC and the Device.

For convenience, the entire suite of PC software and specifications covered by these interface specifications is hereinafter called "NXM."

Figure 2:
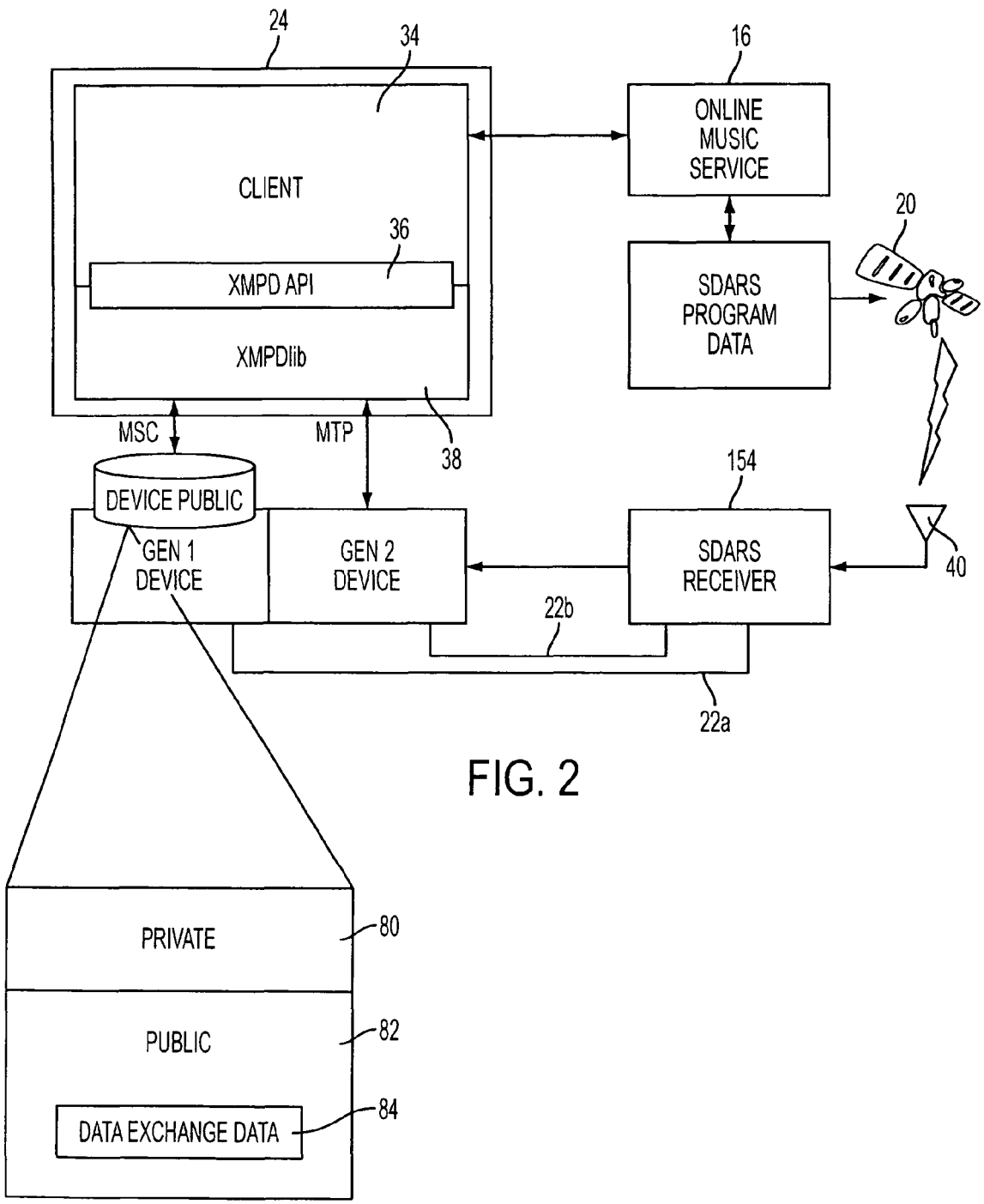
FIG. 2 is a block diagram of client software and an SDARS device according to an exemplary embodiment of the present invention.

FIG. 2 is a block diagram of an SDARS Device 22 according to an exemplary embodiment of the invention connected to a client PC 24. The PC 24 comprises client software 34 and an XMPD API 36 for interacting with an XMPDlib 38. The SDARS Device can either be a Mass Storage Class (MSC) device or a Media Transfer Protocol (MTP) device. Both types 22a and 22b are illustrated in the alternative for convenience. The SDARS Device 22 comprises an antenna 40, an SDARS receiver 154 and a storage medium 126, as will be described in further detail below in connection with FIG. 15. The type of storage medium depends on whether the device is an MSC device or an MTP device, as will also be described in further detail below. In either event, however, the SDARS Device 22 interacts with the client 34 through the XMPD API 36 and the XMPDlib 38, and the SDARS Device 22 preferably stores SDARS content in such a manner that the stored SDARS content is not available to the PC 24. The client PC 24 and client software 34 can also access an online music service 16 through a network 18 such as the internet, as shown in FIG. 1.

Generation 1 Devices 22a supported by NXM incorporate MSC (Mass Storage Class) for device connectivity and PDDRM for digital rights management of files transferred from the PC to the Device. Generation 2 Devices 22b preferably use MTP for device connectivity and Janus for digital rights management.

An exemplary embodiment described herein covers devices using MSC for PC connectivity and PDDRM. However, it should be understood that exemplary embodiments can also use MTP for PC connectivity and Janus for DRM, or any other suitable protocols and DRM methods known to those of ordinary skill in the art.

Abbreviations

The following terms are used throughout this specification, and should be understood as follows:

Bookmark—Refers to the action and result of the user flagging a track heard or recorded on the Device 22 for further exploration in the Online Music Service 16. Bookmarks are stored on the Device as metadata-only database records, separate from content metadata, so they can persist if the content and associated metadata is deleted.

Client—Refers to the software application 34, excluding the XMPDlib interface software 38.

CnP—Connect and Play

Device—General reference to an SDARS-capable portable product. Also referred to as a "player."

DRM—Any type of Digital Rights Management

PDDRM—Microsoft DRM version 9 as implemented on a portable device. Does not support subscription based DRM.

Janus—Microsoft DRM version 10, as implemented on a portable device. Supports subscription based DRM.

Event ID—a 64 bit number generated by the SDARS service from a Program ID (a 32-bit number received over the air with most aired SDARS tracks) and the date the track was aired. The Event ID is used by the online music store/SDARS service back-end systems 16 to manage matches between content received over the air and content in the online music store library.

IE—Microsoft Internet Explorer

Library—The comprehensive list of audio tracks on either the PC ("PC Library") or Device ("Device Library")

Lock—The action and result of flagging an SDARS track on the Device 22 to prevent the track from being overwritten during a subsequent SDARS recording session. The user locks tracks she wishes to keep; tracks that remain unlocked are subject to being replaced during recording sessions.

MSC—Mass Storage Class. A technique for connecting a flash-based or microdrive storage device over USB to a PC, wherein the device's storage appears as a simple external hard drive.

MTP—Media Transfer Protocol. A technique for connecting a flash-based or microdrive storage device over USB to a PC, wherein data is transferred between the device and PC as objects and control information over a communication session.

OTA—Over the air.

Partition—MSC-based Device storage is preferably allocated into two partitions although more partitions can be employed:
(1) Private Content Partition—Contains recorded SDARS content. This partition is not visible to the PC.
(2) Public Content Partition—Containing MP3, WMA files, and Playlists, and Data Exchange files (e.g., SDARS Media Files, profiles, session schedules, and so on) between the Device 22 and NXM implemented in first generation players 22a. This partition is visible to the PC. This partition is implemented as an MSC partition in first generation players.

NXM—Abbreviation used for the entire suite of PC software and specifications described herein.

Online Music Service—online music store providing music downloads and other related services.

Session—A continuous recording of a single channel of SDARS content. A track recorded during a Session can be uniquely attributed to the session through a combination of the Device ID on which the session was recorded, date the session recording started, a Session ID unique for that day on that device, and a Session Sequence Number indicating the order the track was recorded relative to other tracks recorded in the Session.

Track—Minimum individually identifiable audio element. Usually corresponds to a "song", but can also correspond to an excerpt from a news program or even a brief comment from a DJ in between songs. For SDARS content, track boundaries typically correspond to any title/artist change.

WMA—Windows Media Audio, Microsoft's format for audio files.

WMP—Microsoft's Windows Media Player

WMP 10—Windows Media Player version 10, most recent version as of mid-2005, supported by Windows XP only.

WMP9—Windows Media Player version 9, supported by Windows 98SE, Me, 2000, and XP.

SDARS Content—Audio content captured by the Device 22 through the SDARS service, effectively SDARS Media Files and the audio content they represent.

SDARS Media File—A file representing a single track of SDARS Content. SDARS Media Files contain metadata attributes (title, artist, channel, etc.) for the SDARS audio files they represent, as well as a reference to the actual stored SDARS audio content they represent.

XMPDlib—Software component that exposes the "SDARS Device API" to the Client, and communicates with the Device, abstracting the details of the Device interface to the PC Client.

XMRO—XM Radio Online.

Player User Interface Orientation and Operations

In accordance with an exemplary embodiment of the present invention, the player 22 is configured to orient the display and assign functions to the user interface buttons on the player, depending on the orientation of the player while in use. For example, the player 22 can be used with a cradle 120 when docked for use with the PC 24 or when charging. The player 22 has a display 100 for indicating, among other things, channel information for a received SDARS signal or titles of songs or other tracks being received or retrieved from memory for playback. The player 22 comprises one or more buttons (e.g., buttons 102, 104, 106, 108 and 110) to facilitate user operation of the player 22, including track, channel or menu option selections that can be provided on the display 100.

Figure 3A:
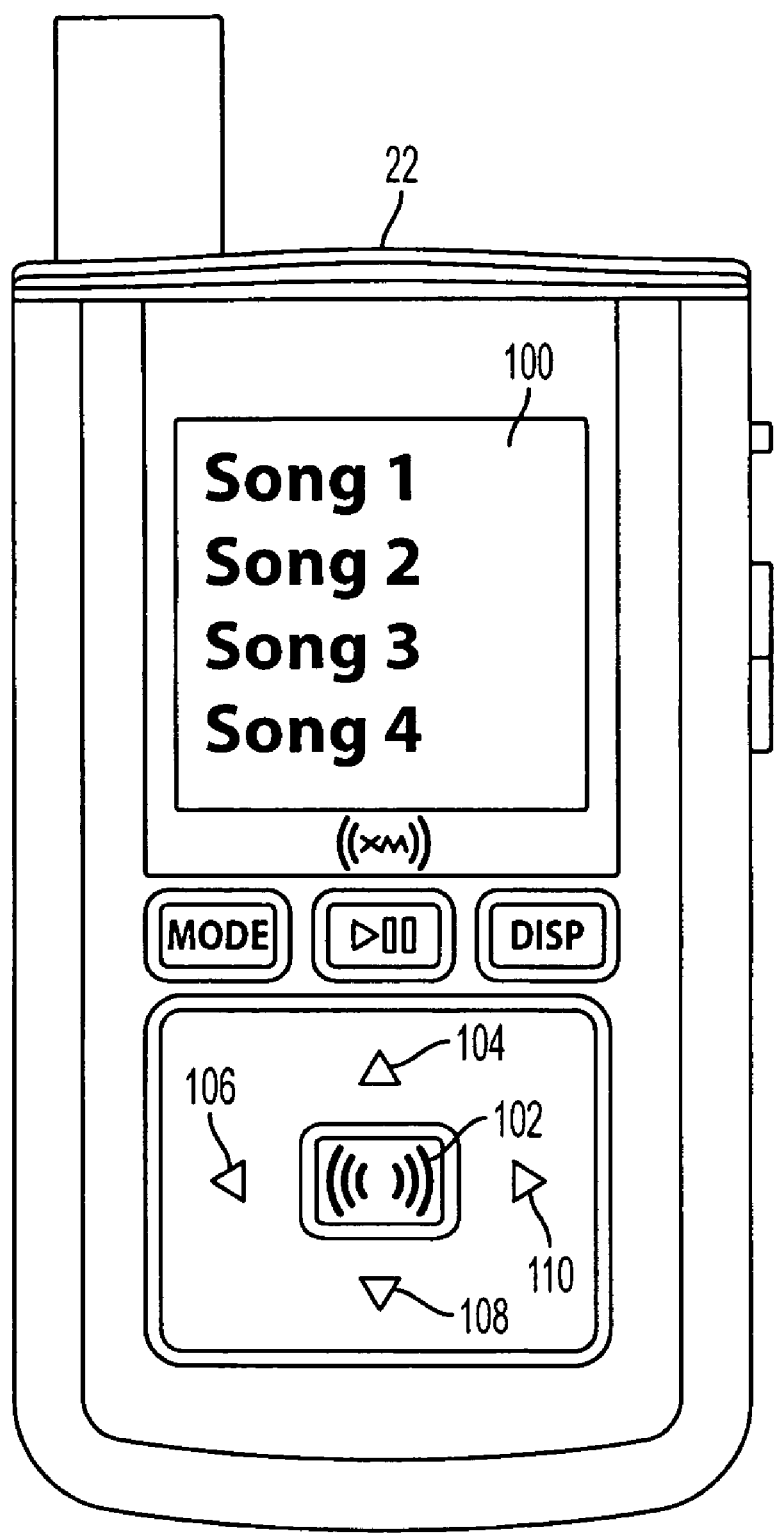
FIGS. 3A, 3B, 3C, 3D and 3E illustrate a player display configured according to exemplary embodiments of the present invention.

When the player 22 is being used as a portable, hand-held device, as shown in FIG. 3A, the player controller 122 operates the display 100 to orient the information being displayed thereon so that it is parallel to the longitudinal axis of the player 22, thereby facilitating viewing by a user carrying the device. Further, the buttons are assigned certain operations. For example, buttons 104 and 108 can be for scrolling among items listed on the display 100, buttons 106 and 110 can be used for navigating forward and backward among a plurality of screens generated on the display 100, and the button 102 can be used for selecting an item on the display 100 (e.g., a song, channel or menu option highlighted on the display).

Figure 3B:
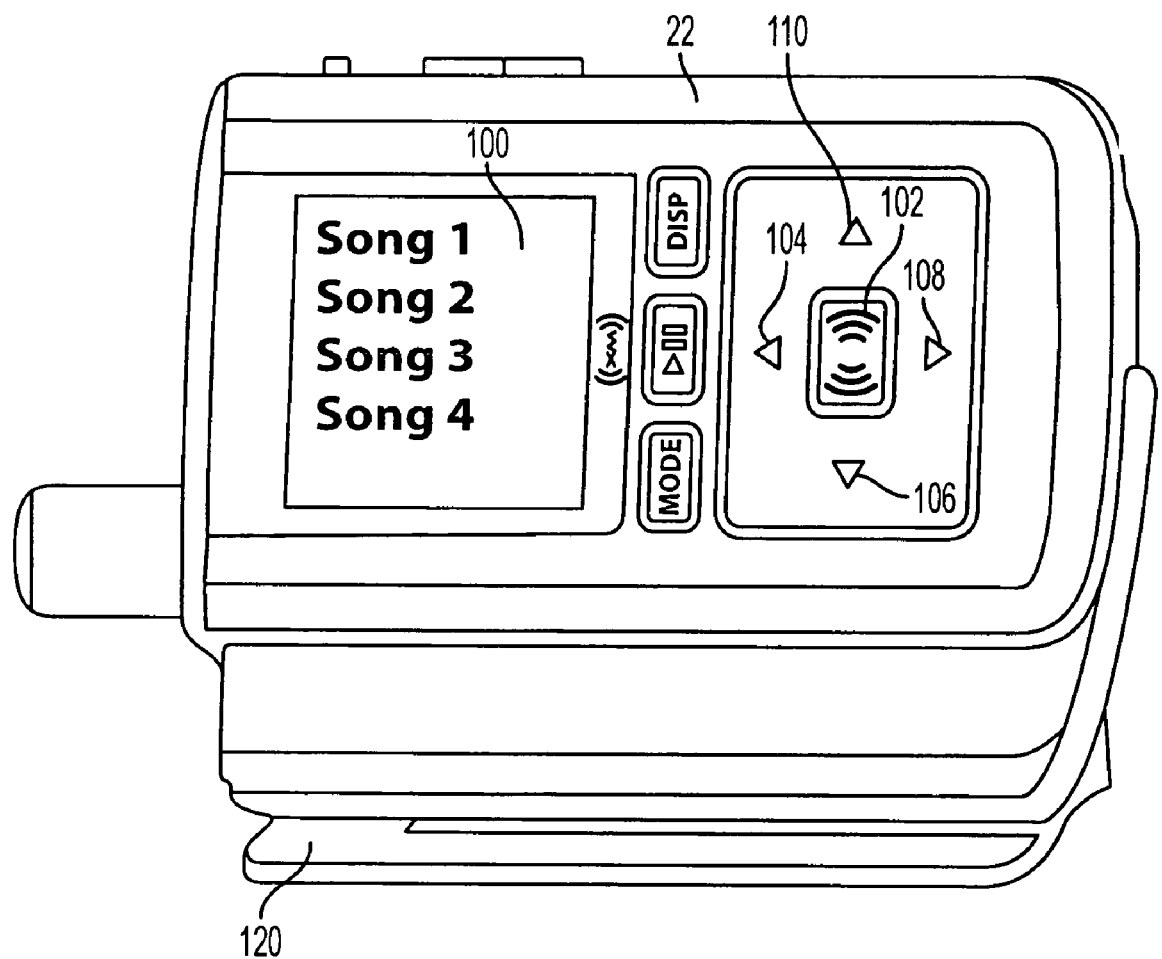

When the player 22 is connected to the cradle 120, as shown in FIG. 3B, the player controller 122 operates the display 100 to orient the information being displayed thereon so that it is parallel to the horizontal axis of the player 22, thereby facilitating viewing by a user of a docked device. Further, the buttons can be assigned different operations than when the player is not docked. For example, buttons 106 and 110 can be for scrolling among items listed on the display 100, and buttons 104 and 108 can be used for navigating forward and backward among a plurality of screens generated on the display 100. The player preferably connects to the cradle 120 via an electrical interface or connector and therefore can be configured to receive an input when a player port is connected to the cradle to facilitate determining when the player is docked.

In accordance with exemplary embodiments of the present invention, other player operations and screens for the display 110 will now be described with reference to FIGS. 3C, 3D and 3E.

Figure 3C:

As shown in FIG. 3C, the player display 100 can indicate when a user is listening to live SDARS content (i.e., SDARS content that is currently being broadcast by the SDARS system 20 and received by the player 22) by generating "XM" or "Live" message 3402 on the display 100, and when the user is listening to recorded SDARS content or MP3/WMA tracks by instead generating "My Music" or similar label.

Figure 3D:
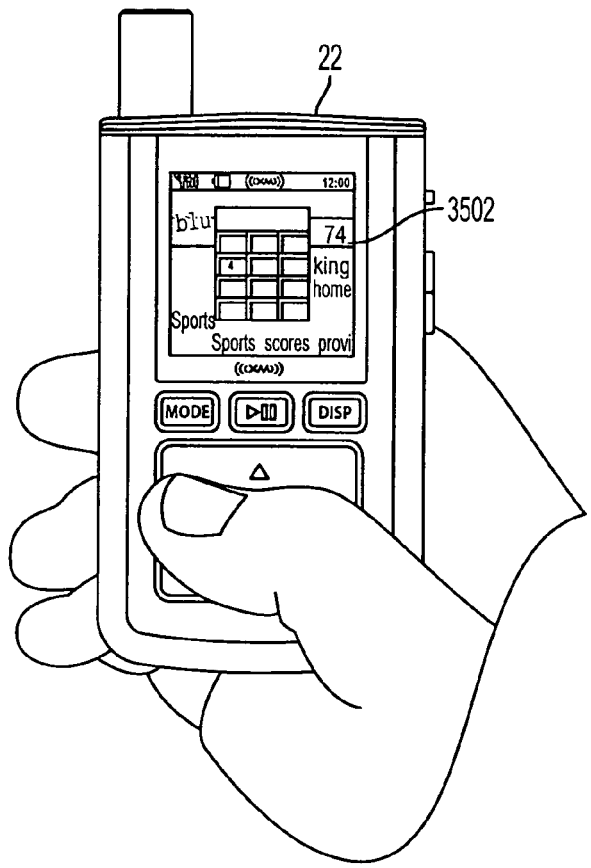

As shown in FIG. 3D, the controller 122 is programmed to assign one of the buttons (e.g., left arrow button 106) the functionality of, when pressed, providing a virtual keypad (e.g., a numeric keypad) 3502 on the display 100 (e.g., for channel tuning).

Figure 3E:
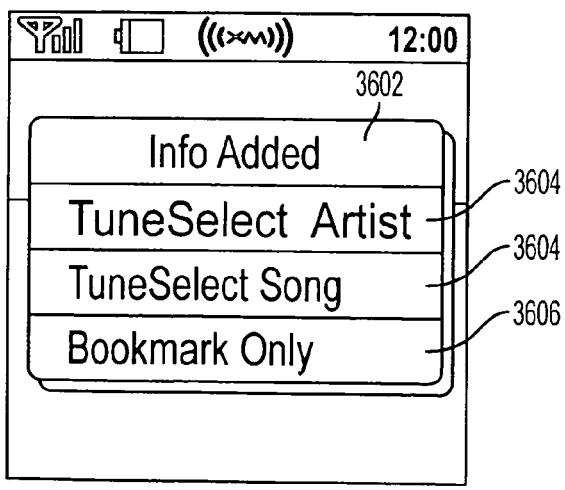

As shown in FIG. 3E, the controller 122 is programmed to provide a TuneSelect operation to allow a user to locate a channel on which a favorite artist or song is currently playing in the broadcast. For example, the controller 122 is programmed to provide a Bookmark menu 3602 on the display 100 when the button 102 is pressed while a track is being broadcast. The Bookmark menu 3602 allows a user to select an artist or song for addition to a TuneSelect list maintained by the controller 122, as indicated at 3604, or to merely bookmark the song, as indicated at 3606. When a song or artist from the list is being broadcast and received via the player 22, the controller 122 causes an indication (e.g., flash "Artist/Song Found" or similar message on the display or beep) to notify the user that a list item is being broadcast on a particular channel. The user need only press the button 102 to switch to that channel. Similarly, the player 22 is programmed to allow a user to select a particular sport or team or stock. The controller 122 can generate virtual keypad (e.g., an alphanumeric/character keypad) on the display 100 to facilitate selection. When a selected button pressed or a menu item is selected, the current news for the selected sport, team or stock is provided on at least part of the display 100.

As with the PC client 34, the player 22 is programmed to provide key operations and display menu options to record SDARS content, schedule a recording session, select and listen to recorded content, and to organize stored content (e.g., organize stored content by genre or artist, generate playlists, bookmark content, add and delete tracks from memory). In addition, the player 22 is configured to generate display screens and menus to allow a user to lock or unlock stored content. Individual tracks can be selectively locked and unlocked, and groups of tracks can be selectively locked and unlocked by artist, category, or channel. Since the player 22 is configured to record content over older tracks first, locking a track prevents it from being automatically recorded over. High quality versions of these tracks can also be purchased for storage in another memory that is not automatically recorded over.

PC/Device Data Exchange Operations

The following sections define the logical contents and format of the files exchanged between a Device 22 and PC 24, according to an exemplary embodiment of the present invention. A description of the files as they relate to the different memory partitions then follows.

SDARS Media File

The SDARS Media File represents SDARS content recorded on the Device 22. For first generation devices based on HCMOS9 receiver technology, this file does not include actual content. However, the file format is designed to accommodate inclusion of encrypted content when used for future products based on CMOS90 receiver technology.

The SDARS Media File is created and maintained by the Device 22, but a few fields (noted below) are created and/or can be modified by the PC 24.

Data Elements in SDARS Media File

The following defines the logical contents of the SDARS Media File.

Fingerprint—Pattern "$XMMX$" (0x24 0x58 0x4D 0x4D 0x58 0x24). Useful for quickly verifying the file as an SDARS Media File.

Major and Minor SDARS Media File Format Version. Initial release: 1.0

Title. Extended title label for the track.

Artist. Extended artist label for the track.

Channel Number. Channel number 1-255 (not necessarily same as SID) over which track was received and recorded.

Channel Name—full text of Channel Name since channel lineup may change after song is recorded.

Category Name—full text of Category Name since channel lineup may change after song is recorded.

Capture-Time, Capture-Day, Capture-Year—Numeric strings indicating the time the track was recorded, relative to the time zone set by the Device user.

Program ID—32 bit number received OTA during recording of track. Zero if unknown.

Program Date—32-bit value indicating date and time (time_t) on which track recording began.

Session Identifier—Consists of three elements identifying the OTA recording session from which this file was captured:

Session Recorder: Radio ID of device that recorded the track. Zero if unknown.

Session Date: Packed date/time (time_t) of start of entire recording session from which this file was captured. (Value will be the same for all tracks in the same recording session.) Zero if unknown.

Session ID: 16 bit binary integer (0-32K), unique for a given player 22 for the Session Date. For individual tracks recorded as a single user action (e.g., "track save" or "record track" feature), the Session ID of each track will differ. For "scheduled" recordings or continuously recorded tracks, each track recorded in a single scheduled session and on a continuous channel will share the same Session ID. If the user changes channel while recording is in progress (and the Device does not halt recording), a new Session ID is assigned (and Session Sequence Number reset to 1) starting with the first track recorded from the new channel (that is, sessions do not span channels).

Session Sequence Number—16-bit integer, starting with 1, indicating order this track was recorded within a given Session. For a track recorded as a single user action (e.g., "track save" or "record track" feature), the Session Sequence Number is 1. For "scheduled" recordings or continuous recordings, each track is assigned an increasing Session Sequence Number starting with 1. (Session Identifiers+Session Sequence Numbers effectively provide the equivalent of CD+Track Numbers for maintaining original ordering)

Duration—Length of track content, in milliseconds. This is actual recorded time calculated by the Device 22, which may be shorter than the full track length in case of truncation.

Record Quality—Indicates quality of data with subfields:
  Errors—Indicates presence of potentially audible errors in content, indicated as an integer percentage from 0 (no errors in any blocks of recorded data) to 100 (all blocks indicate errors). If even one block is erroneous, this factor should preferably show a minimum of 1. Also, if a No Signal Indication is received at any time during recording of the track (which could potentially result in missing blocks of extracted audio data), the Errors should be set to at least 1.
  Truncation—Indicates whether content is complete versus truncated in some way (at the beginning or end of the track). Truncation is possible when:
    the user halts recording or changes stations before completion of a recording track (end-of-track truncation),
    starts recording during a track where the start of the track is no longer buffered by the Device to assure a full recording of the track start (start-of-track truncation),
    or changes to a new station while recording or changes to a new station and starts recording (start-of-track truncation). The Device 22 preferably assumes that the in-progress track after a channel change has not been fully buffered and therefore would be considered truncated if recorded.
  NotRecorded_Restricted—Boolean flag with asserted meaning: content was not recorded due to content license restrictions (that is, an artist/song record restriction was detected for this track during recording).
  NotRecorded_Unsupported—Boolean flag with asserted meaning: Device 22 did not support recording of content for this track (for example, track is AMBE encoded, but the connected Device 22 does not have an AMBE decoder).

Encoder Format (Enumeration: HE AAC+, AMBE, MP3, WMA, Ogg, etc.)

Locked Flag—Boolean; indicating whether this file has been locked on the Device 22 to prevent over-recording. Preferably editable by PC 24.

Online Music Service Search Results—The following fields are optionally stored within the SDARS Media File to cache results of matching the track through the Online Music Service 16. These fields are only written by the PC Client 34 (that is, when the new SDARS Media File is originated by the Device 22, these fields are not included) and have meaning only to the PC Client 34.
  Online Content ID ("CID")-64 bit track ID
  Online Artist ID (64 bits)
  Online Album ID (64 bits)
  Online Rights Flags (8 bits)—Indicates purchase/lease rights available for this track per the Online Music Service.

Content Inclusion—Flags indicating availability of audio content associated with this SDARS Media File:
  Content Included—Content is included in this SDARS Media File.
  Content External—Content is in a separate file, indicated by Content Reference element.
  Content None—No content is available . . . this SDARS Media File is effectively content metadata only (such as, for a Bookmarked, non-Locked track which was recorded over).

Content Reference—Present only if Content Availability is ContentExternal. Indirect reference (string) to audio content associated with this SDARS Media File. This attribute will preferably be used by HCMOS9-based Devices to locate a compressed audio file.

Content—Actual content. Will preferably not be present for any product based on HCMOS9 receiver technology.

File Format of the SDARS Media File

The following are exemplary features of the SDARS Media File format and contents in accordance with an exemplary embodiment of the present invention.

Extensibility—File format accommodates addition of new fields without causing failure of legacy software.

Content Inclusion—File format accommodates inclusion of encrypted, recorded content for future products based on CMOS90 receiver technology.

Dynamic Tags—File format accommodates the insertion of new values for the following fields between blocks of content: Content Format, Title, Artist Extension—Filename extension is preferably .xmm Embedded ID3 Tagging—In a preferred implementation, file format accommodates insertion of standard ID3 tags (either directly or in a container), a type of tag-length-value encoding used for audio files. Thus, a user can preferably manually or programmably back-fill detailed attributes about a saved SDARS track, such as CD title, year recorded, genre, album art graphics, and so on.

Filenames—Though filenames may be generated from some combination of session, track, Program ID, etc. info for convenience, the filename is preferably not the only place such info is available, in case users rename SDARS Media Files.

All strings are preferably represented as extended ASCII except where noted.

All times are preferably time_t (32 bit integer seconds since Jan. 1, 1970 Coordinated Universal Time) based unless otherwise noted.

SDARS Media Files preferably use the extension .xmm There are preferably no other restrictions on the file name.

ID3v2 tagging can be used to encode most of the data elements in the SDARS Media File. Since ID3 is a form of tag-length-value encoding, this allows new data elements to be added to the SDARS Media File in the future without affecting legacy parsers. Also, existing ID3 parsing software components can be easily re-used to handle much of the SDARS Media File parsing. Specifications for the ID3v2 standard can be found online (for example http://www.id3.org/develop.html) and so are not included in this document except for a general overview in describing how ID3 is used in the SDARS Media File.

The SDARS Media File preferably begins with an 8-byte header containing the Fingerprint and the Major and Minor SDARS Media File Format Versions:

Fingerprint Pattern "$XMMX$" (0x24 0x58 0x4D 0x4D 0x58 0x24)

Major Format Version UINT8

Minor Format Version UINT8

ID3 encoding follows the header, beginning with the standard 10 byte ID3v2 Header as follows.

ID3v2/file identifier "ID3"

ID3v2 version 0x03 0x00

ID3v2 flags 0x000000000

ID3v2 tag size 4*0b0xxxxxxx

The ID3v2 flags are zero to indicate no unsynchronization, no extended header, non-experimental, and no footer. The ID3v2 tag size indicates the total length of the "tag" which includes the ID3 header and the following ID3 Frames, plus padding. The ID3v2 tag size is encoded with four bytes where the most significant bit (bit 7) is set to zero in every byte, making a total of 28 bits. The zeroed bits are ignored, so a 257 bytes long tag is represented as $00 00 02 01.

Multiple ID3 frames follow the ID3v2 header. Each frame begins with a 10-byte header preceding the data element value:

Frame ID Four ASCII characters

Frame Size 4*0b0xxxxxxx

Frame Flags Two bytes with value 0x00

For SDARS Media File data elements with no clear equivalent in ID3 declared Frame IDs, Frame IDs beginning with "X" are used to avoid collision with future IDs. Frame Size excludes the 10-byte Frame header. Frame Flags are 0x00 for the data elements within the SDARS Media File.

Unless otherwise noted, all string values are preferably encoded as ISO-8859-1. Terminated strings are terminated with 0x00. Where compliance with ID3v2 declared Frame IDs is useful, numeric values are sometimes encoded as numeric strings. Unsigned integer (UINT) UINT32 Date values are time_t, UTC based.

After all ID3 frames, the SDARS Media File is preferably padded out to the next 128 byte boundary with 0x00 (counting from the start of the Fingerprint sequence in the SDARS Media File header).

The following are data elements that preferably appear in the SDARS Media File, their assigned ID3v2 Frame IDs, and value information. The previous section entitled "Data Elements in SDARS Media File" provides information on the logical meaning of element values.

| Data Element | ID3 Frame ID | Value |
|---|---|---|
| Title | TIT2 | String |
| Artist | TPE1 | String |
| Channel Number | XCHN | UINT8 |
| Channel Name | XCH2 | String |
| Category Name | XCAT | String |
| Capture-Time | TIME | Numeric String (HHMM) |
| Capture-Day | TDAT | Numeric String (DDMM) |
| Capture-Year | TYER | Numeric String (YYYY) |
| Program ID | XPID | UINT32 |
| Program Date | XPDT | UINT32 time_t |
| Session ID | XSID | byte[8] RadioID, UINT32 Date, UINT16 SessionID |
| Session Sequence # | XSEQ | UINT16 |
| Duration | TLEN | Numeric String |
| Record Quality | XRQL | UINT8 Errors, UINT8 Flags: b0 - Truncation b1 - NotRecorded_Restricted b2 - NotRecorded_Unsupported |
| Encoder Format | TFLT | String In addition to ID3 declared frame IDs: "XAAC" - XM HE AAC+ "XVOC" - XM Vocoder |
| Locked Flag | XFLG | UINT8 Flags: b0 - Locked |
| Content Inclusion | XINC | UINT8 Flags: bits 1:0 x0: No content available (metadata only) 01: Content is external 11: Content is included bits 7:2 RFU |
| Content Reference | XREF | String (filename of external content) |
| Online Content ID | XCID | UINT64 |
| Online Artist ID | XAID | UINT64 |
| Online Album ID | XBID | UINT64 |
| Online Rights Flags | XDRF | UINT8 |

SDARS Bookmark File

An SDARS Bookmark File is a metadata-only file essentially identical in format to the SDARS Media File, but preferably with a different file extension (.xmb), in accordance with an exemplary embodiment of the present invention.

In general, an SDARS Bookmark File for a recorded track preferably includes all of the same field values as the corresponding SDARS Media File, except that Content Inclusion and Content Reference fields indicate that no content is included.

For SDARS Bookmark Files for tracks that have not been recorded (that is, no corresponding SDARS Media File has been written to the Data Exchange Partition), the following field value considerations can be observed:

Capture-Time, Capture-Day, Capture-Year—Records start time of track.

Session Identifier—The Session ID can be zero. (Session Recorder and Session Date fields can be recorded as usual).

Session Sequence Number—Value=1.

Duration—Indicates full length of track, in milliseconds. If a channel change occurred during the track, this will indicate duration from and/or up to the channel change (and Truncation will be asserted).

Record Quality—Indicates quality of data with subfields:
Errors—0
Truncation—Indicates whether the Duration field can be considered accurate. In general, if the Device received the full song without intervening channel change the Duration field should be accurate; otherwise Truncation should be asserted.

NotRecorded_Restricted—Same value as if song was recorded.
NotRecorded_Unsupported—Same value as if song was recorded.
Locked Flag—De-asserted
Online Music Service Search Results—These fields may be appended by the PC Client for any Bookmark file, whether recorded or not.
Content Inclusion—Indicate Content None—No content is available
Content Reference—Field can be omitted or use null string value.

TLV Encoding

With the exception of the SDARS Media File, the PC/Device Data Exchange files are preferably encoded using the following tag-length-value (TLV) encoding method:
Tag 1 byte
Length 1 byte or 4 bytes (1 byte if value is 1-255, else 3 bytes additional) Length does not include size of Tag
Value Data Formats:

| | | |
|---|---|---|
| BYTE | 0-255 | |
| UINT16 | 0-0xffff Big Endian | |
| UINT32 | 0-0xffffffff Big Endian | |
| STRING | [ ] of BYTE Zero termination | |

SDARS Device Profile File

A Device Profile file is preferably created and maintained by the Device 22.

For CnP-dependent fields, the data reflects the CnP antenna most recently connected to the Device.

Data Elements of the SDARS Device Profile File
Device Model—ACSII, human-readable for matching PC client databases. Max 16 characters
Friendly Name—ASCII, human-readable for display on PC clients. Max 32 chars. Editable by (PC) user.
Device Hardware Version—major.minor as ASCII string.
Device Firmware Version—major.minor as ASCII string.
Device Serial Number
Radio ID (of most recently attached receiver)—8 character string
Time Zone—User's setting of local time zone on the Device 22 represented as
Offset from GMT in hours
Daylight Savings Time—Boolean
Subscription Status (from Device 22 perspective, these are write-only fields; i.e., should they be modified (improperly) from the PC 24, the values are ignored by the Device):
SDARS Subscription Enabled/Disabled
Content Organization Feature Enabled/Disabled
Storage Status
Private Content Partition
Total Capacity
Capacity used for Locked tracks
Public Content Partition
Total Capacity
Data Exchange Partition (zero for MTP-based Device)
Total Capacity
Supported Partitioning Options
Continuous Partitioning Allowed (Boolean)
Number of Discrete Partitioning Options (may be zero)
For each Discrete Partitioning Option:
Percent reserved for Private Content Partition Media Content Capabilities
Audio
Enumeration of supported audio media files (e.g. MP3, WMA, WAV, XMM, etc.)
Each enumerated audio format type includes format-specific parameters, such as:
Maximum data rate
VBR supported (Boolean)
Enumeration of supported Playlist file formats (e.g. M3U, WPL, etc.)
Imaging
Enumeration of supported image types (JPEG, GIF, etc.)
Each enumerated image format type includes format-specific parameters, such as:
Maximum resolution
Maximum color depth
DRM Support
Enumeration of DRM support (Janus, PDDRM, etc.)

Data Format of the SDARS Device Profile File
The filename of the SDARS Device Profile File is preferably Device Profile.tlv
An exemplary SDARS Device Profile File 400 is TLV-encoded, as shown in FIG. 4.

SDARS Channel Lineup File

The SDARS Channel Lineup File captures the list of authorized channels determined during the most recent connection of the Device 22 to a live SDARS radio signal (e.g., reception of SDARS live content broadcast via satellite, terrestrial repeater, wired network, and so on). It is primarily intended for use by the PC Client 34 in displaying available channel information for the recording session user interface.

Data Elements of SDARS Channel Lineup File
Data pertaining to the entire Channel Lineup File preferably includes:
Major/Minor Channel Lineup File version—e.g. 8-bit quantity with major version in high nibble, minor version in low nibble.
Total number of Channels defined by the file.
Total number of Categories defined by the file.
For each authorized Channel:
Channel Number
Channel Name
Category Index (positional reference to Category list)
For each Category:
Channel Category Name Data Format SDARS Channel Lineup File
The filename of the SDARS Channel Lineup File can be Channel Lineup.tlv
The SDARS Channel Lineup File is TLV encoded as follows.

| Field | Tag | Length | Values |
|---|---|---|---|
| Version | 0x01 | 2 | Major/Minor [2] BYTE |
| Total Channels | 0x02 | 2 | Total Channels UINT16 |
| Total Categories | 0x03 | 1 | Total Categories UINT8 |
| Channel Lineup entry | 0x04 | v | Chan Num BYTE |
| | | | Chan Name STRING |
| | | | Category BYTE (index Category) |
| Category | 0x05 | v | Cat Num BYTE |
| | | | Category Name STRING |

SDARS Recording Sessions File

SDARS Recording Session File captures data pertaining to sessions recorded by the Device 22.

Data Elements of the SDARS Recording Sessions File

Data pertaining to the entire Recording Sessions File preferably include:

Major/Minor Recording Sessions File version—e.g. 8-bit quantity with major version in high nibble, minor version in low nibble.

Maximum number of recording sessions allowed by the Device.

For each Recording Session in the Recording Session File:
Session Name (null string if unknown)
Session Start Time
Session Start Date
Session Duration (in seconds, though UI of Device and/or PC may limit resolution to minutes)
Session Channel Number
Session Repeat Parameters—Daily Repeat, Weekly Repeat, Number of Repeats Data Format of the SDARS Recording Sessions File The filename of the SDARS Recording Sessions File is preferably "Recording Session.tlv".

The SDARS Recording Sessions File is TLV encoded as follows.

| Field | Tag | Length | Values |
|---|---|---|---|
| Version | 0x01 | 2 | Major/Minor [2] BYTE |
| Maximum Recording Sessions | 0x02 | 2 | Max Sessions UINT16 32k max |
| Recording Session | 0x05 | v | start Time/Date UINT32 (time_t) Duration UINT32 seconds Chan BYTE Repeat info: Type ENUM (ONCE, DAILY, WEEKLY) Count BYTE 1-255 repeats 0 = forever Session Name STRING |

Playlist File

Native Playlist Files created by the Device 22 or by NXM can use the m3u format, consisting of simple references to MP3, WMA, and SDARS Media Files by filename.

Playlist Files support playback of MP3 and WMA files that are located in subdirectories in the Public Content Partition.

References to SDARS Media File filenames in the Playlist Files are preferably denoted by an extension of .xmm.

Playlists preferably support 80 character playlist filenames.

PC Directive File

The PC Directive File in the Data Exchange Partition is used by the PC application (NXM) to indicate that there have been certain updates or commands from the PC 24 that need to be processed on the next Device 22 boot cycle. The PC Directive File is preferably implemented as a primitive script, created by the NXM for execution by the Device 22 upon boot.

The PC Directive File is preferably transparent to the Client 34, and used only by XMPDlib 38 and an MSC-based Device 22a.

Data Elements of the PC Directive File
Identification Header

The following data elements are preferably provided in an Identification Header for integrity purposes. To deter malicious reformatting, the Device 22 preferably verifies that they match the Device's equivalent fields before proceeding with any re-partitioning. NXM retrieves these fields, for example, from the SDARS Device Profile File when constructing the PC Directive File.

Device Model
Device Hardware Version
Device Firmware Version
Radio ID

Directive Commands of the PC Directive File

The Identification Header is preferably followed by one or more Directive Commands with corresponding parameters.

Command: Update SDARS Track Attributes. Indicates an attribute in an SDARS Media File has been updated by the PC 24, and the Device 22 therefore needs to update the corresponding data on the Private Content Partition.
Parameters: SDARS Track File Name.

Command: Delete SDARS Track. Indicates that the PC 24 has deleted an SDARS Media File, and the Device 22 therefore needs to delete the corresponding data on the Private Content Partition.
Parameters: SDARS Track File Name.

Command: Add Playlist. Indicates that a new Playlist has been added to the Data Exchange Partition by the PC 24.
Parameters: Playlist File Name.

Command: Update Playlist. Indicates that a Playlist on the Data Exchange Partition has been updated by the PC 24.
Parameters: Playlist File Name.

Command: Delete Playlist. Indicates that the PC 24 has deleted a Playlist from the Data Exchange Partition.
Parameters: Playlist File Name.

Command: Update Firmware. Directs the Device 22 to update firmware based on a Device Firmware Update File.
Parameters: Name of Device Firmware Update File.

File Format of the PC Directive File

The filename of the PC Directive File can preferably be Directive.tlv

The PC Directive File is TLV-encoded as follows.

| Field | Tag | Length | Values |
|---|---|---|---|
| Identification Header UINT16 | 0x01 | 20 | CRC16 (Validate file) Model STRING Hardware Version STRING Firmware Version STRING RadioID [8] BYTES |
| Update SDARS Track Attributes STRING | 0x02 | V | SDARS Track File Name |
| Delete SDARS Track STRING | 0x03 | V | SDARS Track File Name |
| Add Playlist STRING | 0x04 | V | Playlist File Name |
| Update Playlist STRING | 0x05 | V | Playlist File Name |
| Delete Playlist STRING | 0x06 | V | Playlist File Name |
| Update Firmware Firmware | 0x08 | V | Name of Device Update File STRING |

SDARS Device Firmware Update File

The SDARS Device Firmware Update File is referenced by an Update Firmware command in the SDARS PC Directive File and contains a firmware update for the Device 22.

Devices can provide alternative methods of installing firmware updates that do not involve the SDARS Device Firmware Update File or SDARS PC Directive File. In such cases, the manufacturer preferably employs techniques that prevent theft of SDARS services and content through installation of a hacked firmware update file. For example, a method of providing encrypted firmware to the SDARS player can be used.

Data Elements of the SDARS Device Firmware Update File
  Version Number (major+minor)
  Minimum replaceable version (major+minor)
  Bits
  CRC File Format of the SDARS Device Firmware Update File The SDARS Device Firmware Update File is preferably TLV-encoded as follows.

| Field | Tag | Length | Values |
|---|---|---|---|
| Version Number | 0x01 | 2 | Major/Minor [2] BYTE |
| Earliest Compatible Version | 0x02 | 2 | Major/Minor [2] BYTE |
| Bits | 0x02 | V | File contents (DRM'ed) |
| CRC | 0x03 | 2 | CRC32 UINT32 |

Derivative Device Specifications

Exemplary supplemental specifications and implementation guidelines will now be described for any MSC/PDDRM-based Device intended for compatibility with the client software 34, related to management of the PC/Device Data Exchange files.

Partitions

The Device 22 preferably provides two partitions to flash memory:
  Private Content Partition 80—Contains recorded SDARS content. Not visible to the PC 24.
  Public Content Partition 82—Used to store MP3 and WMA files, playlists and Data Exchange files (e.g., SDARS media files, profiles, session schedules, and so on) between the Device 22 and NXM 24. Visible to the PC 24. Implemented as an MSC partition in first generation players.

The Public Content Partition 82 is important, even for nominal "100% SDARS partitioning", to essentially always provide a partition that is visible to the PC 24 to allow synchronization of SDARS Media Files, playlists, profile, and so on. Minimum MSC partition size for each 1 GB of SDARS partition is preferably 12 MB.

Partition Contents
Data Exchange Partition Contents

The Device 22 preferably maintains the following files on the Public Content and Data Exchange Data Partition 82 (see PC/Device Data Files described above regarding file contents):
  SDARS Media File, one for each SDARS content file present in the SDARS partition.
  SDARS Bookmark Files
  SDARS Device Profile File
  SDARS Channel Lineup File
  SDARS Recording Sessions File
  Playlist Files All files in the Data Exchange Partition are preferably stored in a hidden folder named "xmsys".

The Device 22's master copy of the following data files are maintained in the Data Exchange Partition (no other copy is maintained on another partition of these files):
  SDARS Bookmark Files
  SDARS Device Profile File
  SDARS Channel Lineup File
  SDARS Record Schedule File Private Content Partition Contents The Device 22 maintains the master copy of the following data files in the Private Content Partition:
  SDARS Media File, one for each SDARS content file present in the SDARS partition. (In an alternative implementation, the Device 22 does not maintain a duplicate copy of the SDARS Media Files in the Private Content Partition, but does have the ability to regenerate SDARS Media Files in case of accidental erasure of the Data Exchange Partition contents.)
  SDARS compressed audio files.

Public Content Partition Contents

The following files are preferably stored only in the Public Content Partition:
  MP3 and WMA files
  Playlist Files created and transferred by external programs such as Windows Media Player
  JPEG images
  General files transferred to the Public Content Partition (MSC) directly by the user through file explorer, etc. (spreadsheets, documents, and so on.).

Device File Management Rules

The Device 22 provides recovery from accidental erasure of all contents of the Data Exchange Partition, so that such an event does not result in loss of Locked SDARS tracks accumulated by the user in the Private Content Partition (see Data Exchange Partition Recovery below).

Power-Up File Management

At each power-up, the Device 22 preferably performs the following tasks:
  If the Device 22 detects any of the following states of the Data Exchange Partition, the Device initiates Data Exchange Partition Recovery (described below) before proceeding with power-up.
    1. Inability to access the file system on the Data Exchange Partition (i.e. file system corruption detected, to extent possible by Device)
    2. Absence of the xmsys folder on the Data Exchange Partition
    3. Absence of the Device Profile File or the Recording Sessions File on the Data Exchange Partition.
  In a preferred implementation, the MSC-based Device 22a will search for a PC Directive File on the Data Exchange Partition. If such a file exists, the Device can verify that the Identification Header in the PC Directive File matches the Device, then respond to the Directive Commands within the PC Directive File with the following priority order:
    1. Update SDARS Track Attributes
    2. Delete SDARS Track.
    3. Update Firmware
  Upon completion of all commands in the PC Directive File, the Device 22 can delete the PC Directive File.

The Device 22 preferably does not attempt to verify/repair the contents of any Playlist Files on power up.

Data Exchange Partition Recovery

The partition exposed by MSC devices 22a to a PC 24 is subject to corruption or data loss due to (1) improper disconnect of the Device 22 from the PC 24 or (2) a user accidentally erasing the contents of the partition using Windows Explorer or other OS tools. For the overall Public Content and Data Exchange Partition 82, recovery by the user is usually possible since a copy of the MP3 and WMA files in that partition are typically also on the user's PC. However, the Data Exchange Data 84 is preferably only created by the Device 22 and, moreover, preferably provides the only window into the SDARS audio content on the Private Content Partition.

Should the Device 22 interpret missing SDARS Media Files on the Public Content and Data Exchange Partition 82 as a signal to delete corresponding files in the Private Content Partition, the result could be the permanent loss of locked SDARS content. The Data Exchange Partition Recovery procedures are intended to prevent this from occurring and to ensure synchronization between the SDARS Media Files in the Data Exchange Partition with the corresponding files in the Private Content Partition. Also, the procedures described herein can be followed during "normal" creation of the default Data Exchange Partition such as initial factory reset or after repartitioning the Device flash storage.

The Device 22 preferably performs the following steps when recovering the contents of the Data Exchange Partition.
1. Reformat the Data Exchange Partition (eliminates all data and folders on that partition)
2. Create the xmsys hidden folder
3. Create the SDARS Device Profile File.
4. Create a SDARS Recording Sessions File containing no scheduled sessions.
5. For each recorded track in the Private Content Partition (regardless of Lock status), create a corresponding SDARS Media File entry in the Data Exchange Database. During Data Exchange Recovery, the following files will not be created or recovered:
Playlist Files
SDARS Channel Lineup File
SDARS Bookmark Files
PC Directive File During the Data Exchange Data Recovery process, the Device can display a message to the user such as "Please wait—Preparing Data".

Run-Time File Management

In a preferred implementation, each time a track is recorded, the Device 22 creates an SDARS Media File on the SDARS partition, and when recording is complete, makes a copy of the SDARS Media File in the Data Exchange Partition.

In a preferred implementation, the Device 22 updates the Storage Status in the SDARS Device Profile File upon changes that affect storage capacity, such as lock status changes, recording of a new SDARS track, or user deletion of a new SDARS track. These updates are preferably made concurrent with the precipitating event to ensure the Storage Status parameters are correct upon next connection to the PC.

Upon creation, editing, and deletion of a playlist, the Device 22 edits the playlist on the Data Exchange Partition.

Upon capturing a full channel lineup from the SDARS receiver 154, the Device 22 preferably writes the SDARS Channel Lineup File. This can be performed at least once during each power-up session with live SDARS reception. In a preferred implementation, the Device 22 preferably also monitors the channel lineup for changes and rewrite the SDARS Channel Lineup File upon detected change.

Run-Time Policies and Specifications

Various run-time policies are implemented by the Device 22 and PC 24 and client 34 in accordance with exemplary embodiments of the present invention.

SDARS DRM Enforcement Policy

The Device 22 enforces SDARS DRM policies in accordance with an exemplary embodiment of the present invention. In particular, if the PC Client 34 inadvertently or maliciously attempts to perform SDARS content management functions that are not allowed due to elapsed SDARS subscription or locking/organizing authorization, the Device ignores such attempts.

Playlist Management Policy

When playing a Playlist, any reference to a track no longer present on the Device 22 is skipped.

When playing a Playlist and the SDARS subscription and/or locking/organizing authorization is lapsed, any references to SDARS tracks in the Playlist are skipped.

To support Plays4Sure capabilities, the Device 22 can play Playlists (with supported Playlist formats) detected on the Public Content Partition through one of the following methods:
1. Detect and play the Playlists directly from the Public Content Partition
2. On power-up, detect supported Playlists on the Public Content Partition and move them to the Data Exchange Partition.

Recording Policy

Recording policies shall now be described for the following recording scenarios:
1. the user manually initiates recording of a currently playing track and the beginning of the track is no longer buffered in RAM of the Device 22,
2. the user changes to a new channel and starts recording the currently playing track (which the Device 22 assumes has already been in progress and therefore not fully buffered),
3. the user is recording and changes to a new channel while recording (and therefore begins recording a new track which the Device 22 assumes has already been in progress and therefore not fully buffered). The Device preferably implements the following policies:

Recording can proceed, and the Truncation flag is asserted in the SDARS Media File associated with the recorded track. Attributes in the associated SDARS Media File related to track start time can be based on the time the actual recorded audio data began. Duration in the SDARS Media File can be based on the duration of the audio actually recorded.

Furthermore, in scenario (3), the track that was being recorded before the channel change can be stored with the Truncation flag asserted (indicating end-of-track truncation).

Bookmarking Policy

In accordance with an exemplary embodiment of the present invention, a user can Bookmark a track intended for exploration with the Online Music Service 16. Bookmarking a track causes the Device 22 to create an SDARS Bookmark File in the Data Exchange Partition, and effectively copies the corresponding SDARS Media File for the track. Since an SDARS Bookmark File is separate from an SDARS Media File, it survives even if the corresponding SDARS Media File is deleted by overwrite during a subsequent recording session or intentionally by the user.

If the user deletes a track tagged as Bookmarked, the audio data associated with the track is preferably deleted as usual, but the SDARS Bookmark File corresponding to the Bookmarked and overwritten file is preferably not removed from the Data Exchange Partition.

SDARS Bookmark Files are preferably not stored in the Private Content Partition.

The Device 22 preferably limits the number of Bookmarked files to 500. In a preferred implementation, a new Bookmark after the limit is exceeded will replace the oldest Bookmark.

The user preferably has the ability to Bookmark a playing track, regardless of when the action occurs during track playback, and regardless of whether the track is being recorded. If the track is Bookmarked, but not recorded, then only the SDARS Bookmark File on the Data Exchange Partition need be written. This further requires the Device 22 to buffer all metadata necessary to create an SDARS Bookmark File for the currently playing track even if the track is not being recorded, in case the user decides to Bookmark the track near the end of the track.

In a preferred implementation, the Device 22 preferably provides a user interface for viewing and deleting all Bookmarks.

Capturing PID (Program ID) Policy

SDARS transmits a 32-bit Program ID for each track transmitted over the air. A new Program ID is provided with each significant artist/title change. The Device 22 preferably must capture the Program ID (and track start time, based on the SDARS system time) to populate the Program ID and Program Date fields in SDARS Media Files and SDARS Bookmark Files. Program IDs can be used by the PC Client 34 and Online Music Services 16 to manage matching of SDARS tracks received over the air by the Device 22 with corresponding content in the Napster online library. The Device 22 issues the CbmLabelBICMonReq CBM command to enable reception of the Program ID through the CbmSngTimeInd CBM indication. The Program ID is then available to the Device 22 when a new track starts (and title/artist labels change), or if the Device is tuned to a new channel during ongoing track transmission (that is, CbmSngTimeInd with Program ID can be received during mid-track).

Diagnostics Policy

The Device updates the Diagnostics fields in the SDARS Device Profile File with data and selected circumstances. This is intended primarily to augment Type Approval testing of SDARS DRM-compliance from a PC-based test application.

Client PC Application

The client PC 34 application interacts with the SDARS Device 22 to provide additional functions in accordance with an exemplary embodiment of the present invention. The client application 34 will now be described in further detail.

When a compatible SDARS Device 22 is connected to a PC 24 running the client application 34, the Device 22 is detected during device discovery and additional options are enabled in the client application that are related to interaction with the SDARS Device 22. During the discovery process, the model and capabilities of the SDARS Device 22 are preferably determined by the client 34. The client user interface (UI) preferably provides for:

Manipulation of stored SDARS content (such as to lock or delete stored SDARS songs)

Building combined playlists containing SDARS songs intermixed with DRM and/or non-DRM protected media files.

Using bookmarked SDARS songs for music discovery, such that bookmarked songs can be matched to corresponding media files of an online music store for purchase or subscription-based download.

Interfacing to SDARS content received over an internet connection.

Scheduling of SDARS recordings.

Upgrading of SDARS Device firmware.

Figure 5:
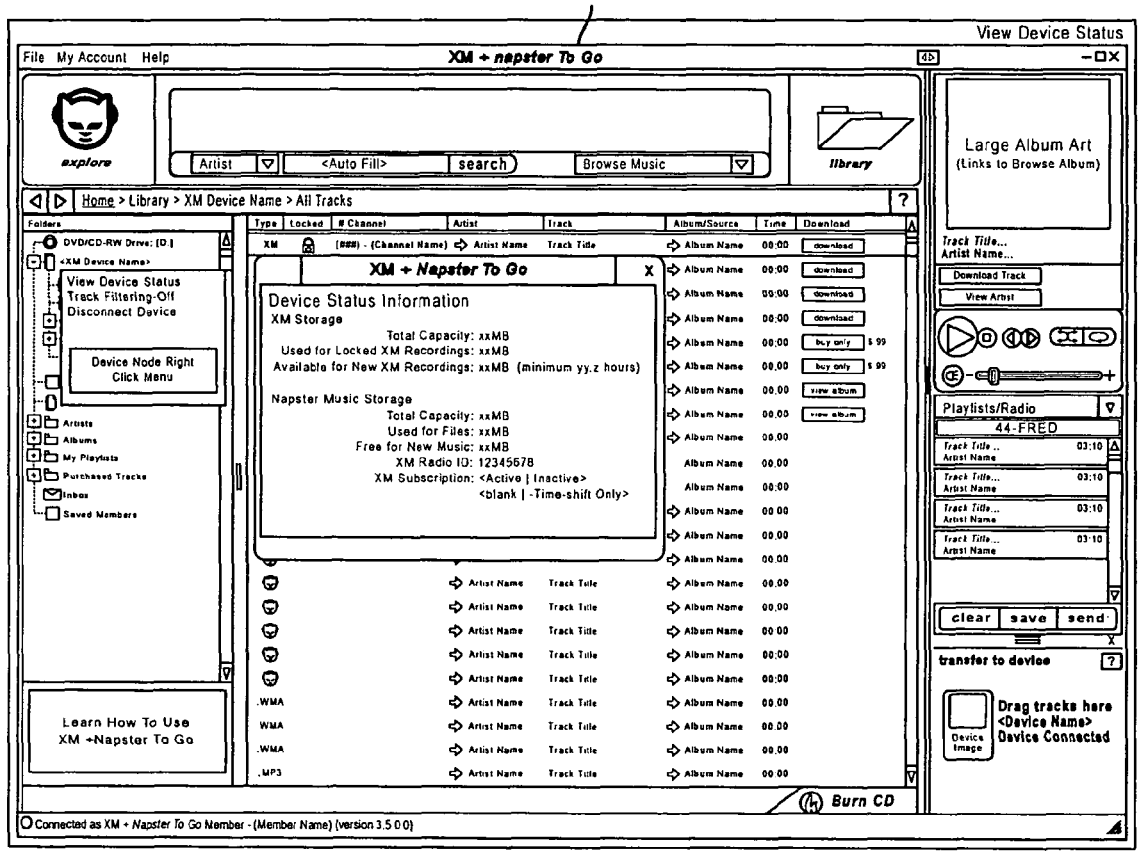
FIGS. 5, 6 and 7 are screenshots of client software for interacting with an SDARS device according to exemplary embodiments of the present invention.

FIG. 5 illustrates a screenshot 500 of the client application 34. After the SDARS Device 22 is connected to the PC 24, the client application 34 retrieves device status and profile information from the Device 22. The device status and profile information is preferably retrieved from an SDARS Device Profile file stored on the Device 22, as described above.

Figure 6:
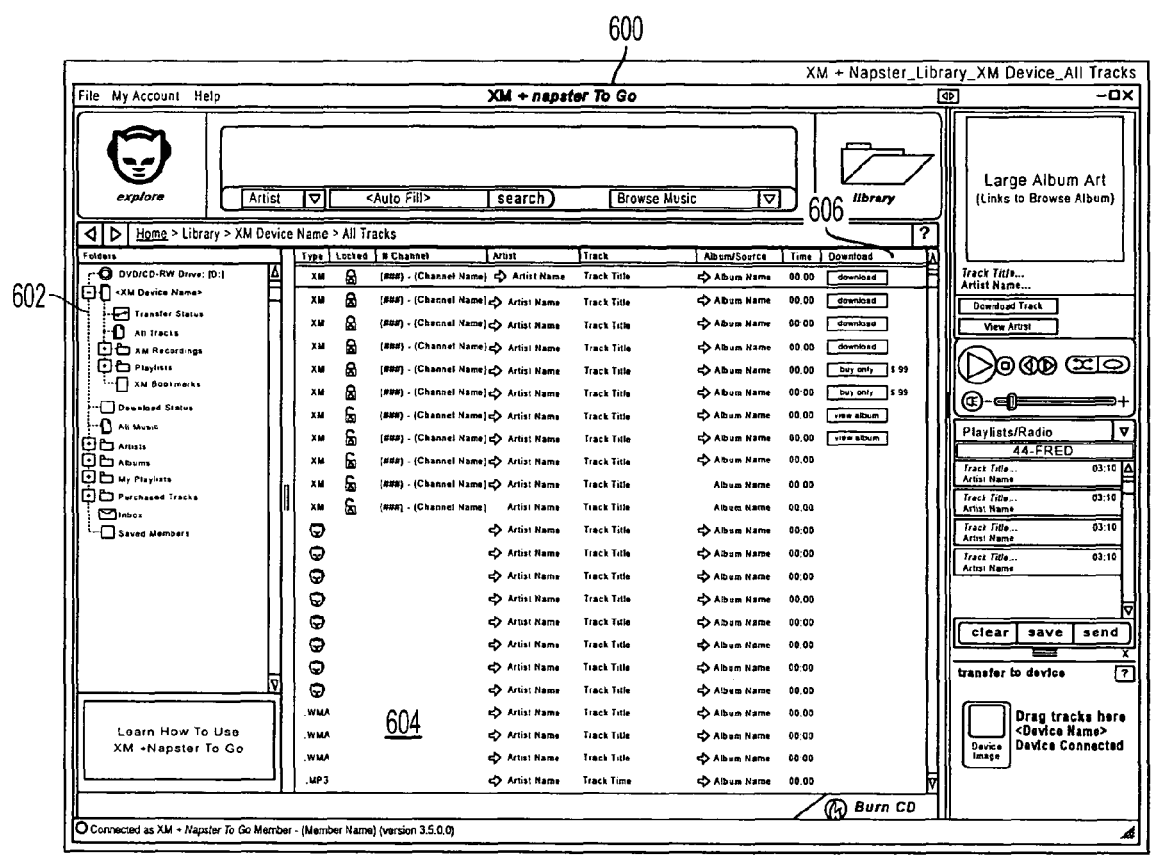

FIG. 6 illustrates a screenshot 600 of the client application library interface. A folder structure is shown that includes a node 602 for the discovered SDARS Device that is connected to the PC. A track listing 604 shows all of the tracks stored on the Device 22, including locked SDARS content, unlocked SDARS content, DRM and non-DRM protected music files, or the tracks stored on the PC 24. As can be seen in the download column 606 of the track listing, option buttons appropriate for each SDARS track stored on the Device 22 are provided. The option buttons allow the user to make a request from an online media store 16 based on track information in the related stored SDARS track. Thus, for example, for the first four listed stored SDARS tracks, an option to download a corresponding track from the online music store 16 is presented. This option would typically be presented if the track was available for subscription-based download. For the next two stored SDARS tracks, an option to purchase the corresponding track from the online music store is presented. This option would typically be presented if the particular tracks were not available for subscription-based download, but were available for full purchase. For the next two stored SDARS tracks, an option to view album is presented. This option would typically be presented if the particular tracks were not available for subscription-based download or purchase.

Figure 7:
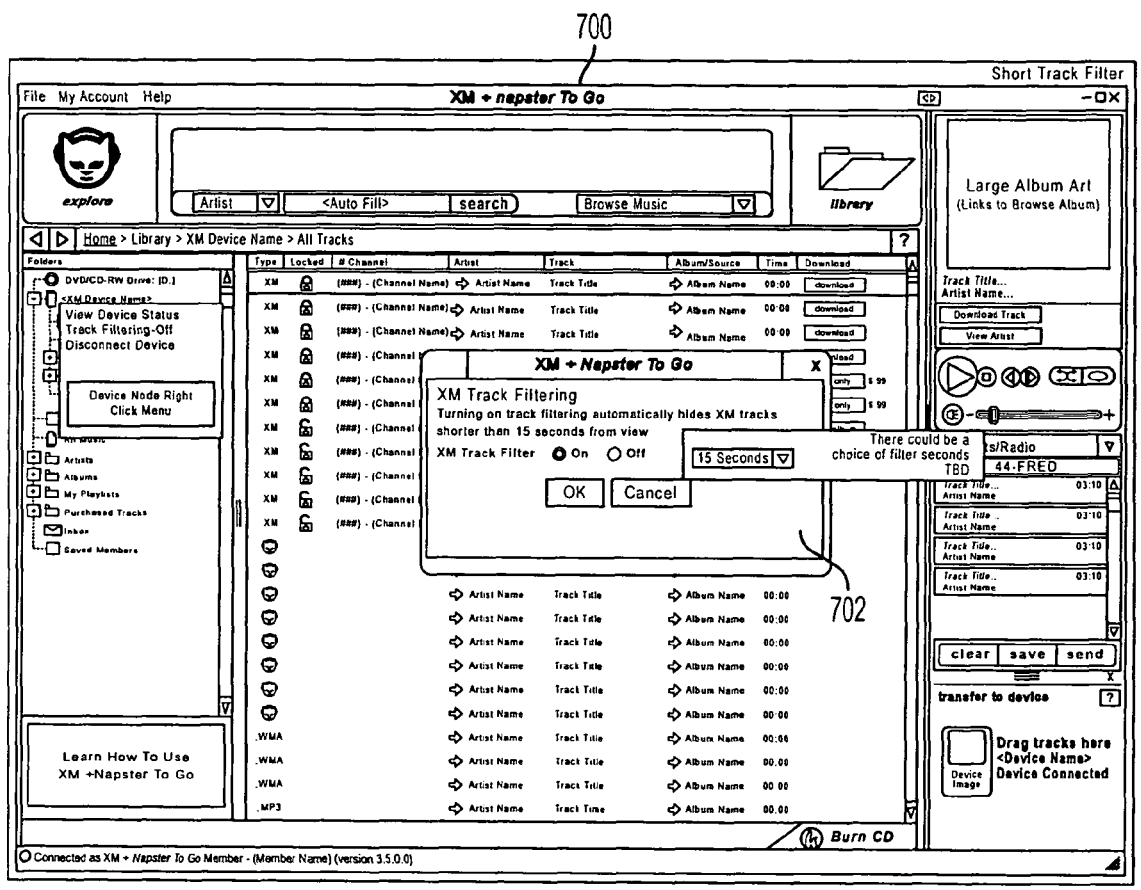

FIG. 7 illustrates screen shot 700 indicating a short track filtering function 702 that can optionally be performed by the client 34. As will be described in greater detail below, SDARS recording sessions are preferably divided into separate individual tracks according to changes in PID/PAD data. Accordingly, some portions of a recording session might be identified as tracks that correspond to short segments between songs, such as a DJ talking in between songs. The track filtering function provides the option of not showing these short tracks, and preferably provides an option to determine the minimum duration of a track.

Figure 8:
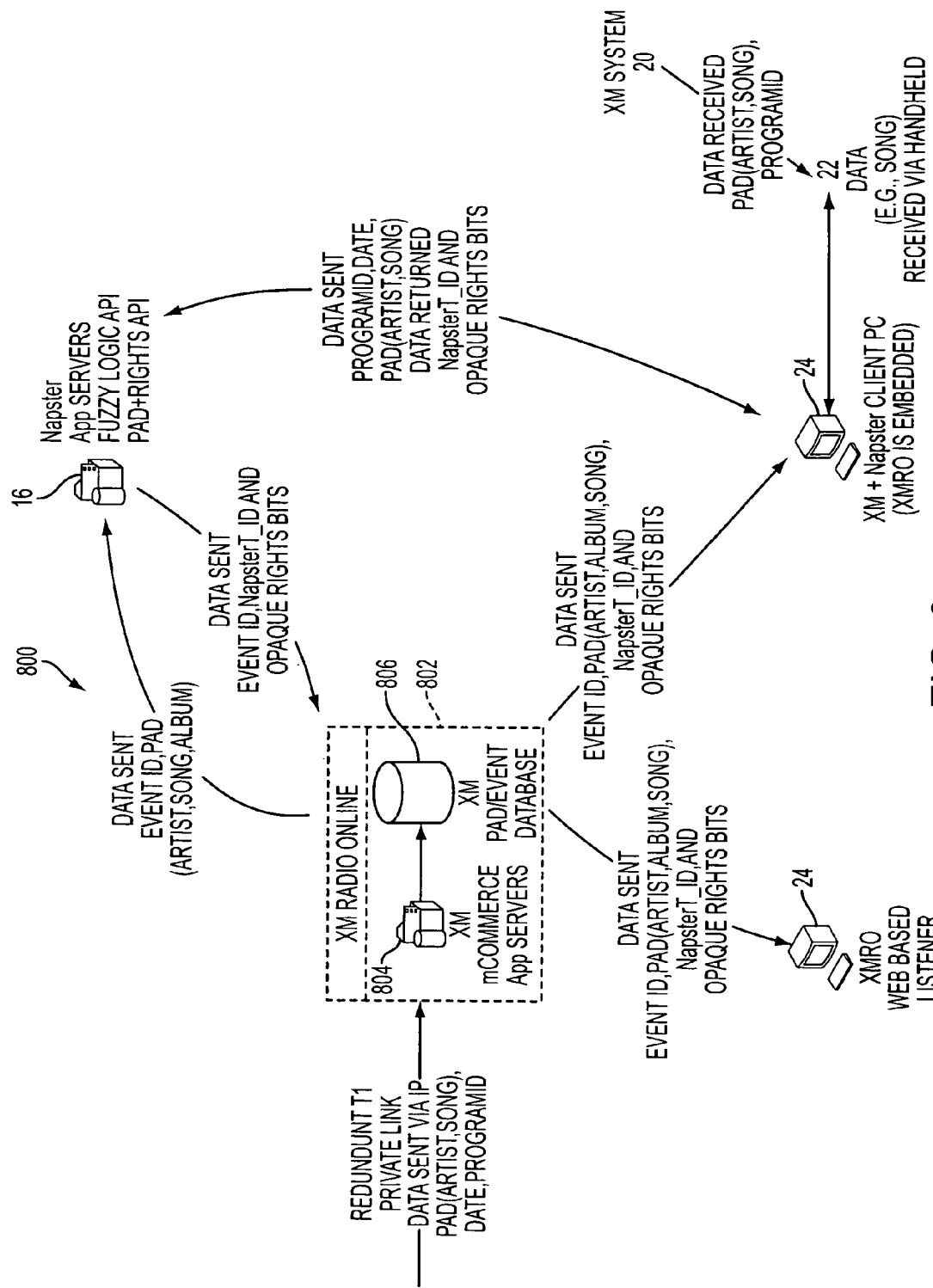
FIG. 8 illustrates a system for matching PID/PAD data of stored SDARS tracks to tracks of an online music service according to an embodiment of the present invention.

FIG. 8 illustrates an exemplary system 800 for matching PID/PAD data of stored SDARS tracks to tracks of an online music service 16. In one exemplary embodiment of the present invention, an event ID is extracted from a stored SDARS track, and the event identifier (ID) and a partner ID (e.g., an ID unique to a particular online music service) are passed over the internet to a server of the SDARS service. The SDARS service server identifies the event ID and returns metadata corresponding to the track. The metadata can contain unique ID numbers identifying the corresponding track of the online music service. Alternately, metadata such as track and song title can be passed to a server of the online music service, which can then match the metadata to a corresponding music track of the online music service. Any suitable method of matching, including fuzzy logic can be used to perform the match.

An SDARS online service 802 (e.g., XM Radio Online or XMRO) can be provided that employs commerce application servers 804 and a PAD/Event database 806. The SDARS online service 802 can receive data (e.g., PAD, date and Program ID) via a link. An embedded SDARS online service player (e.g., XMRO player) can be provided in the client 34 to communicate with XMRO infrastructure (e.g., SDARS online service 802) to obtain PAD and rights to currently playing music. To reconcile the rights for the handheld device 22, the client 34 communicates with the Napster infrastructure indicated generally at 16. The Napster infrastructure 16 matches the PAD information to a unique Napster track ID. They store the matched unique Napster track ID with the unique event ID in memory (e.g., a quick lookup cache). The unique event ID can be generated from the ProgramID and date.

Figure 9:
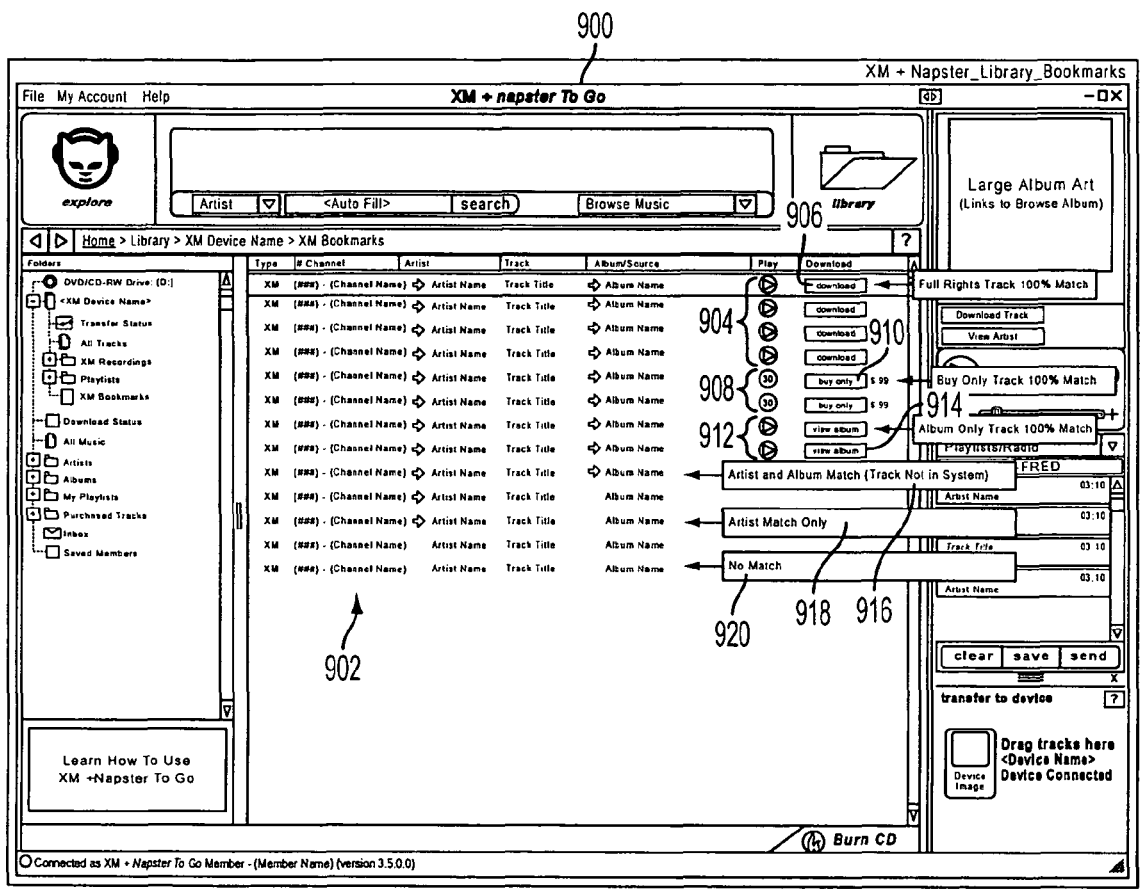
FIGS. 9, 10, 11, 12, 13, and 14 are screenshots of client software for interacting with an SDARS device according to exemplary embodiments of the present invention.

FIG. 9 illustrates a screenshot 900 of a listing 902 of SDARS bookmarks on the PC 24 that is generated using the client software 34. SDARS bookmark files are described above. Also, as described above, a user of the SDARS Device 22 can "bookmark" songs while he or she is listening to a particular channel, an operation which results in generating a metadata file containing information about the track, including song name, artist name, album name, and so on in accordance with the present invention. The listing 902 of bookmarks is retrieved by the client 34 from the SDARS Device 22, and used to provide the user with the ability to explore the bookmarks and obtain tracks from an online music service 16 based on the bookmarks. As shown, the bookmarks may or may not have a unique match to a track offered by the online music service 16, and varying rights may be associated with any such track. Thus, for example, the first four bookmarks 904 shown have an exact match at the online music service 16, and the user is entitled to download the tracks under their subscription. A download button 906 is provided. The next two bookmarks 908 have exact matches, but the matched tracks are not available for download under the user's subscription. They are, however, available for purchase, and a "buy" button 910 is provided. The next two tracks 912 have exact matches at the online music service 16, but the individual tracks are not available for download under the user's subscription, and the tracks are not available for individual purchase. In this example a "view album" button 914 is provided. If the user presses the "view album" button 914, information about the album is retrieved from the online music service 16 and presented, and an option to purchase the entire album together may be provided, if appropriate.

The next bookmark 916 shown in FIG. 9 does not have an exact track match at the online music service 16, but there are artist and album matches. The next two bookmarks 918 have artist matches, but no album or track matches. The last two bookmarks 920 shown in FIG. 9 have no matches.

Figure 10:
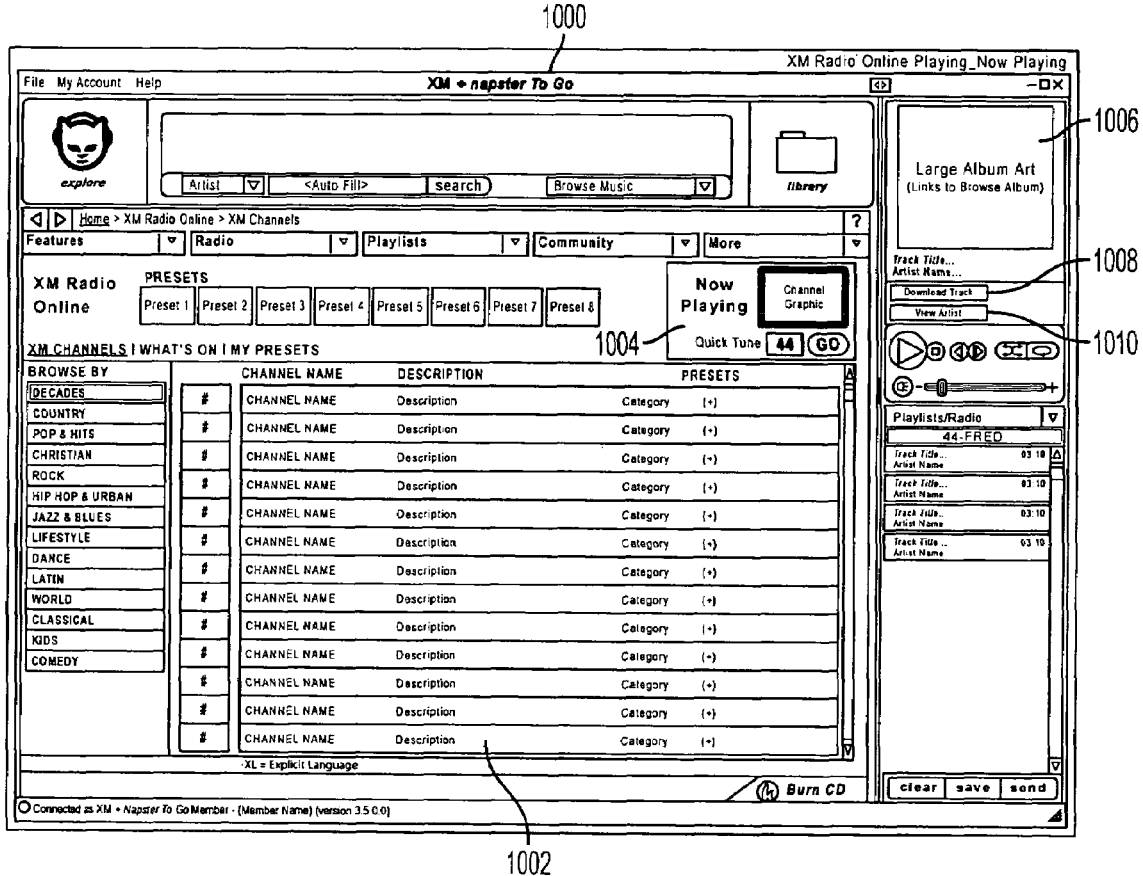

FIG. 10 is a screenshot 1000 of an SDARS online function of the client software 34 in accordance with an exemplary embodiment of the present invention. SDARS content can be received by the client PC 24 over an internet connection 18 to the SDARS service. Accordingly, if authorized, currently playing SDARS service channels can be received and played on the client PC 24. As shown, the client software 34 provides an interface to navigate the channel list 1002, and view information on what is playing on the various channels. In addition, the track currently being played on the client PC 24 is displayed in a window 1004, preferably along with album art 1006 for the track, as appropriate. As with SDARS bookmark files, the PID/PAD data of currently playing tracks in the SDARS online interface can be used to match tracks available from the online music service 16. Option buttons such as the "download track" and "view artist" buttons 1008 and 1010 shown in FIG. 10 can be provided as appropriate based on whether a match was found at the online music service 16, and what rights are available for the track.

Figure 11:
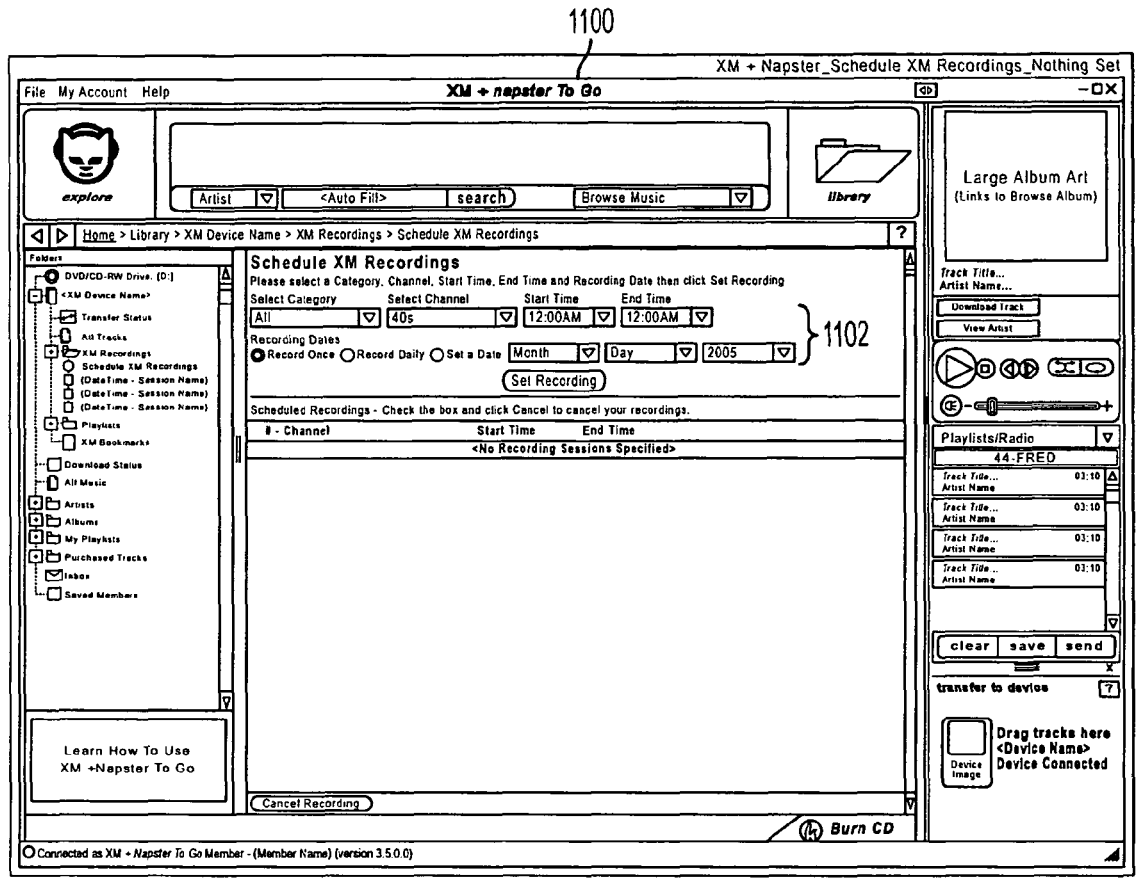
Figure 12:
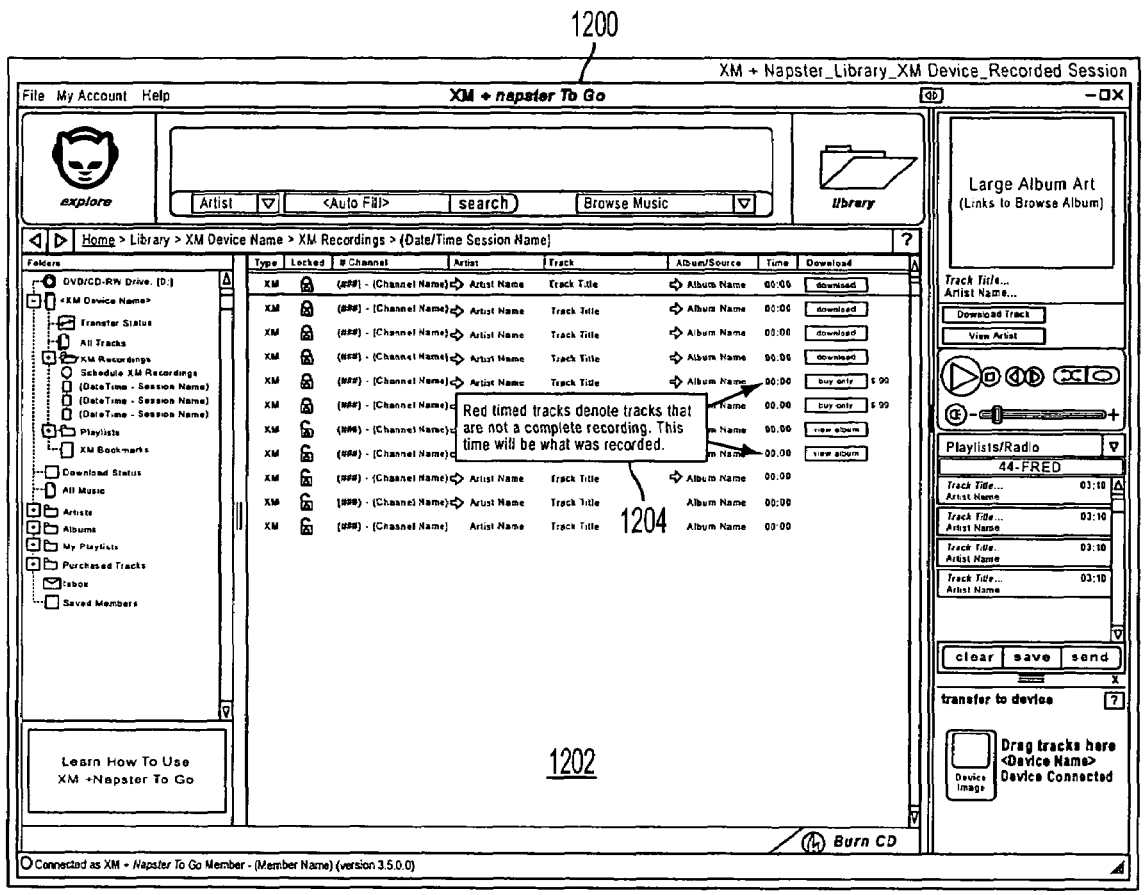
Figure 13:
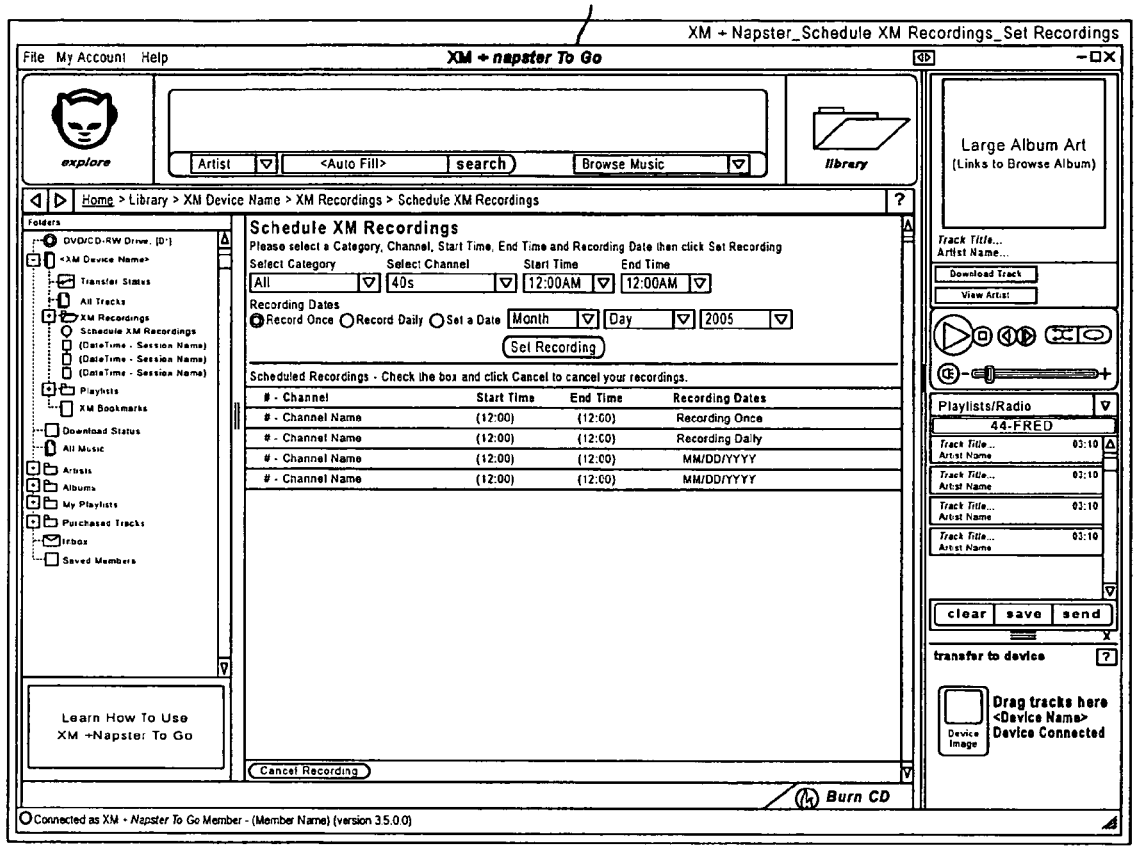

FIGS. 11-13 are screenshots 1100, 1200 and 1300, respectively, that illustrate a "scheduled recording" function provided by the client software in accordance with the present invention. FIG. 11 illustrates an exemplary screenshot 1100 of an interface for scheduling a recording. Channel number, start time and end time, date, and once or daily options indicated generally at 1102 are provided for the recording. Once recordings are set, the SDARS Device 22 records the designated channel at the designated time. FIG. 12 illustrates an exemplary screenshot 1200 showing a listing 1202 of recorded sessions. The recorded sessions reside in the SDARS player 22, and are preferably not available to the connected PC 24. However, shadow files corresponding to the recorded sessions are available to the client software 34 on the PC 24, providing access to the recorded sessions without compromising the security of the SDARS audio content. As shown at the fifth and eighth tracks in a particular recording session, if a track is truncated (the beginning or ending of the track was not recorded), a truncation flag 1204 is set, and the actual time of the track is highlighted to show that the full track was not recorded. FIG. 13 illustrates an exemplary screenshot 1300 of an interface for reviewing and modifying scheduled recordings.

Figure 14:
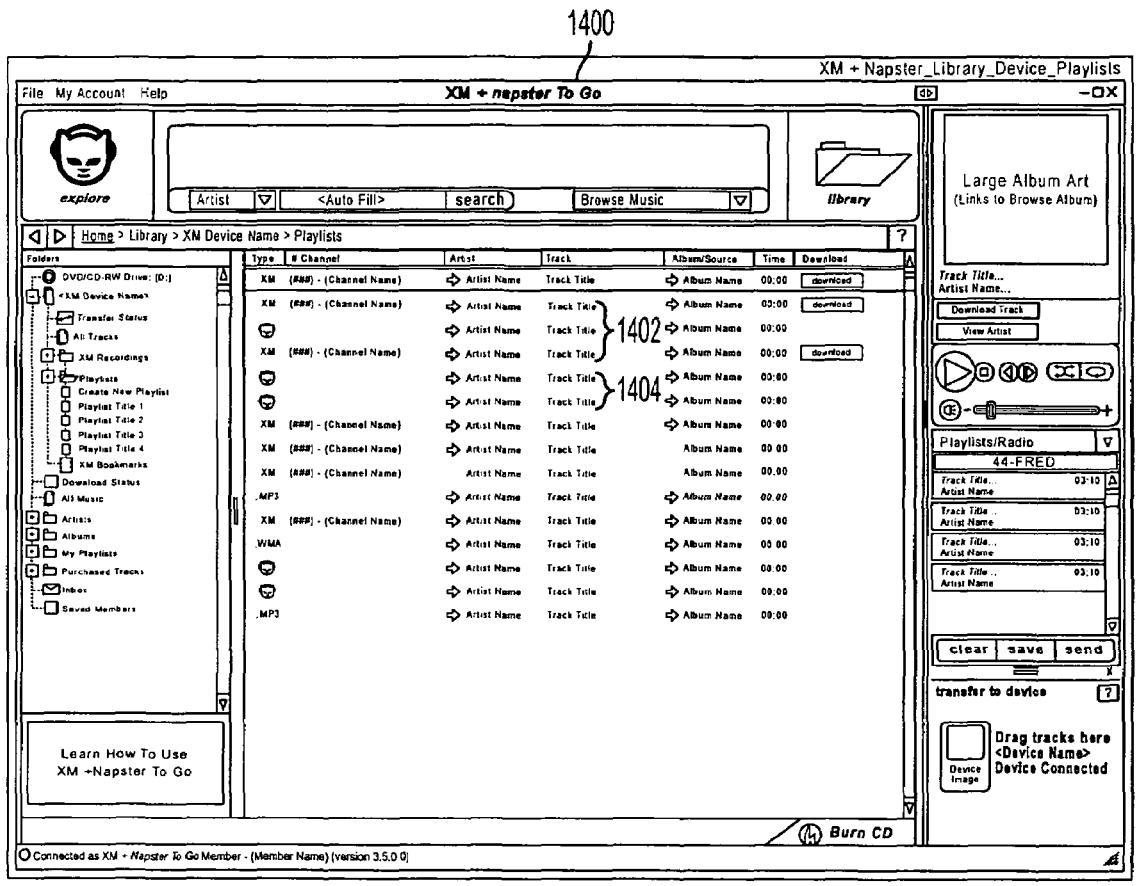

An SDARS Device 22 according to an exemplary embodiment of the present invention preferably enables the creation of mixed playlists comprising both recorded SDARS tracks indicated generally at 1402 and DRM or non-DRM protected media files indicated generally at 1404. FIG. 14 illustrates an exemplary screenshot 1400 of the client interface for reviewing a mixed playlist. As shown, SDARS tracks are intermixed with subscription-based downloads and DRM and non-DRM protected media files (such as MP3, WMA, AAC, AAC+, OGG, among others). The SDARS tracks 1402 are made available through SDARS Media files (e.g., shadow files) that represent the corresponding SDARS audio content on the private SDARS Device memory partition 80 (that preferably remains invisible to the client PC 24). So long as the user's SDARS subscription remains valid, the SDARS tracks 1402 can be organized and played back along with other media files 1404.

As described above, the SDARS/PC and portable player system of the present invention employs a client application 34 at a PC 24 that communicates with a preferably portable user device or player 22. The SDARS-capable user device or player 22 is provided with a device API 36 for communicating with the client application.

Exemplary embodiments of the SDARS-capable portable user device or player 22 will now be described.

Figure 15:
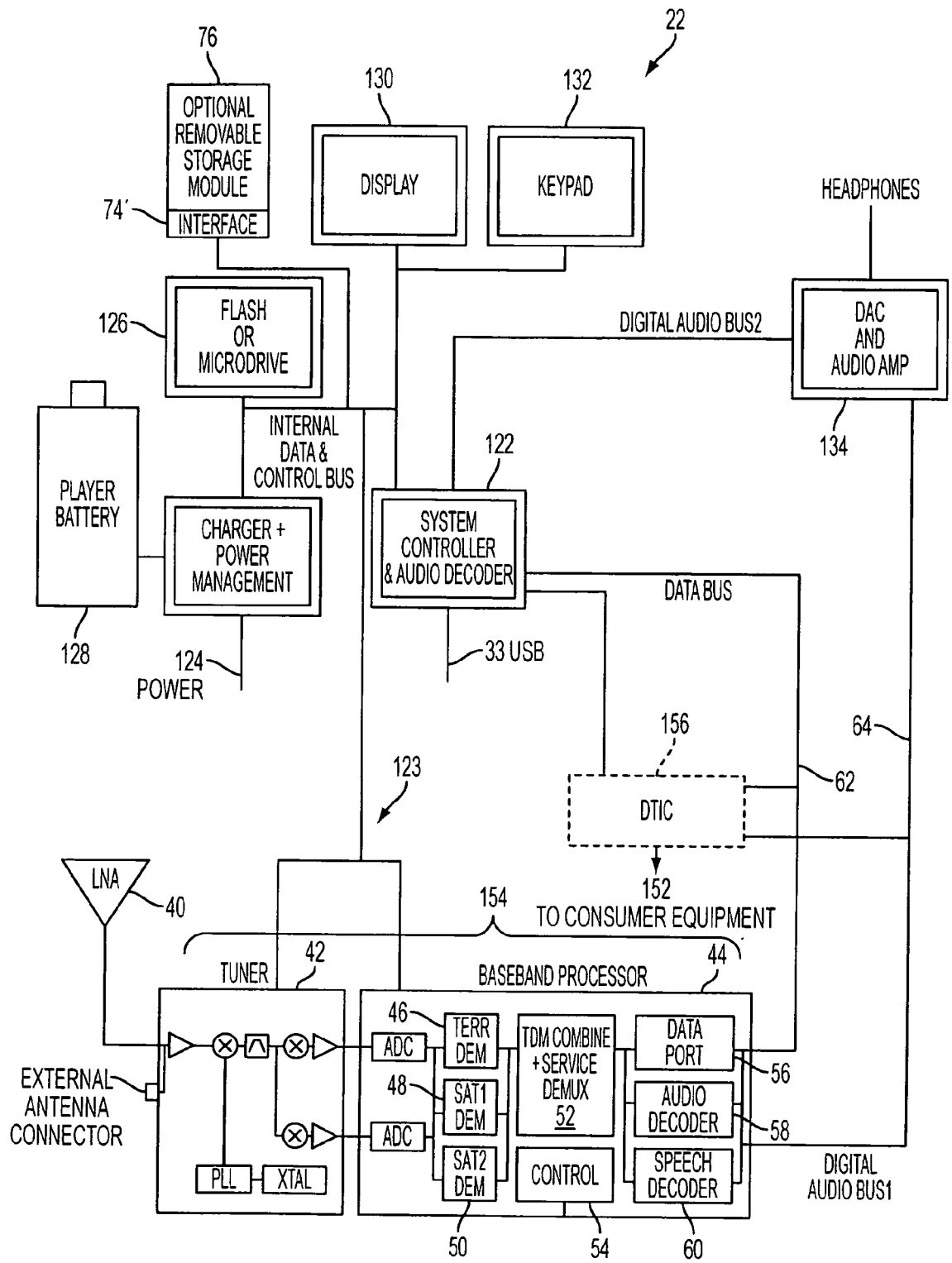
FIG. 15 is a block diagram of an exemplary SDARS player according to an embodiment of the present invention.

FIG. 15 depicts the components of an exemplary player 22. The player comprises a display 130 and keypad 132 to facilitate browsing and selection of channels for playback and content for storage, and a memory device 126 such as a flash or micro drive for storing selected content. The player 22 also comprises a battery 128 and charger/power management device 124, a system controller and audio decoder 122, a digital analog converter (DAC) and audio amplifier module 134, and an SDARS receiver 154. The system controller 122 controls player components via an internal data and control bus 123.

The player 22 preferably employs an antenna 40 with a low noise amplifier (LNA) for receiving an SDARS signal. The SDARS receiver 154 comprises a tuner 42, and a baseband processor 44. The SDARS receiver 154 preferably comprises three receiver arms for processing the SDARS broadcast stream received from two satellites and a terrestrial repeater, as indicated by the demodulators 46, 48 and 50, that are demodulated, combined, decoded and demultiplexed to recover channels from the SDARS broadcast stream, as indicated by the controller 54 and TDM combine and service demultiplexer module 52. Demultiplexed data from the SDARS broadcast stream is provided to a data port 56 and the data bus 62. Demultiplexed audio, speech and the like are provided to audio and speech decoders 58 and 60 having outputs to the digital audio bus 64. Processing of a received SDARS broadcast stream is described in further detail in commonly owned U.S. Pat. Nos. 6,154,452 and 6,229,824, the entire contents of which are hereby incorporated herein by reference.

With continued reference to FIG. 15, a digital audio bus 62 preferably transports uncompressed audio. The digital audio bus 62 can transport, for example, an I2S formatted signal which is known in the industry. The data bus 64 can be used for the output of non-audio or compressed audio signals. The player 22 is configured to decode signals employing various types of encoding. By way of an example, the speech decoder 60 can provide AMBE speech decoding. The audio decoder 58 or the system controller 122 can provide AAC, AAC+, WMA, MP3, and XMA decoding, among other types.

The player 22 can be connected to a personal computer (PC) via a USB as indicated at 33. As described above, the system controller 122 is provided with a device API 36 that communicates with the client application 34 described above. The player 22 can therefore be operated with the PC 24 to manage playlists of content stored from the received SDARS stream, as well as other content files, and to otherwise search and navigate among stored content.

The player 22 can comprise an optional bus multiplexer or digital transceiver integrated circuit (DTIC) 156 or other interface from the player 22 to a corresponding interface in another device. The DTIC 156 is described in U.S. patent application Ser. No. 11/239,642, filed Sep. 30, 2005 and incorporated in its entirety herein by reference. Briefly, a DTIC 156 is provided in each of at least two devices that are connected via a link to control communications on the link. Thus, the DTIC 156 provides a cost effective means for an electronics equipment manufacturer to be SDARS-compatible since the manufacturer can provide a DTIC in a media player or other consumer electronic device 152, and another DTIC in a corresponding SDARS receiver module (e.g., a cartridge 190) that is preferably detachable from the media player, to allow the media player and the SDARS receiver module to communicate with each other via the link.

The manufacturer preferably configures the DTIC 156 in the media player 22 to operate as a master device with respect to the DTIC 156 in the corresponding SDARS receiver module (e.g., consumer electronic device 152) since the media player 22 typically has a user interface 130, 132 and controller 122. Accordingly, the DTIC 156 in the SDARS receiver module is preferably configured to operate as a slave device. The two DTICs 156 each multiplex data and audio streams (e.g., from an SDARS content stream) that are transported between the media player 22 and the SDARS receiver module into a time division duplex (TDD) high frequency serial link that is preferably implemented as an EIA-422/484 physical interface. By way of an example, the DTIC 156 can implement a TDM TDD bus multiplexer 70 in a cartridge 190 as shown in FIG. 18.

A communications cable connecting the DTICs 156 preferably comprises four wires, with preferably two wires for supplying power (such as DC power and ground), and two wires providing bidirectional, differential communication between two devices.

Figure 16:
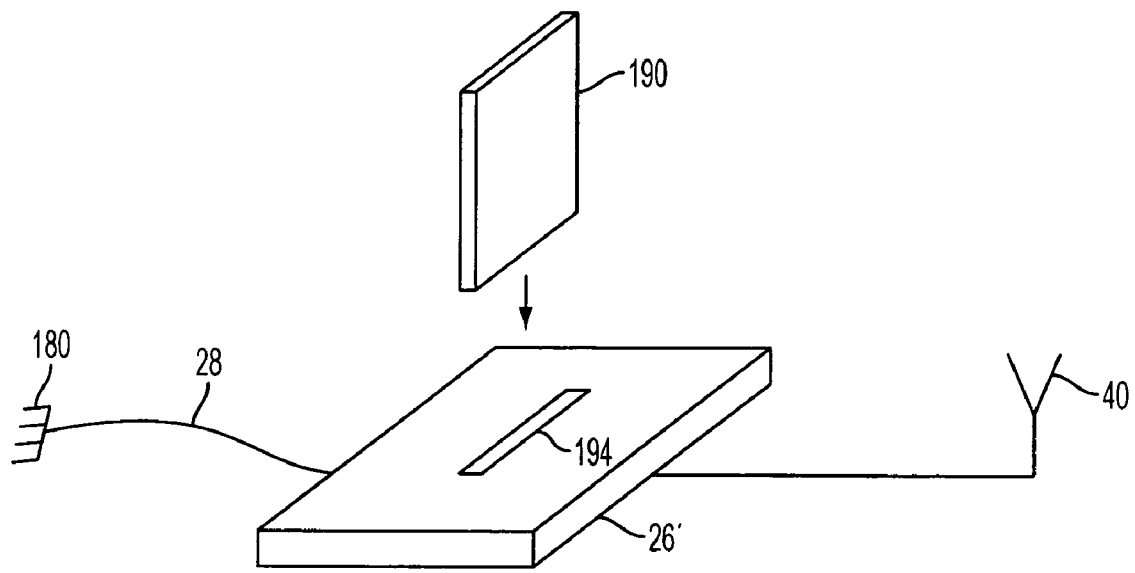
FIGS. 16, 17 and 18 depict an SDARS player and a docking station according to an exemplary embodiment of the present invention.
Figure 17:
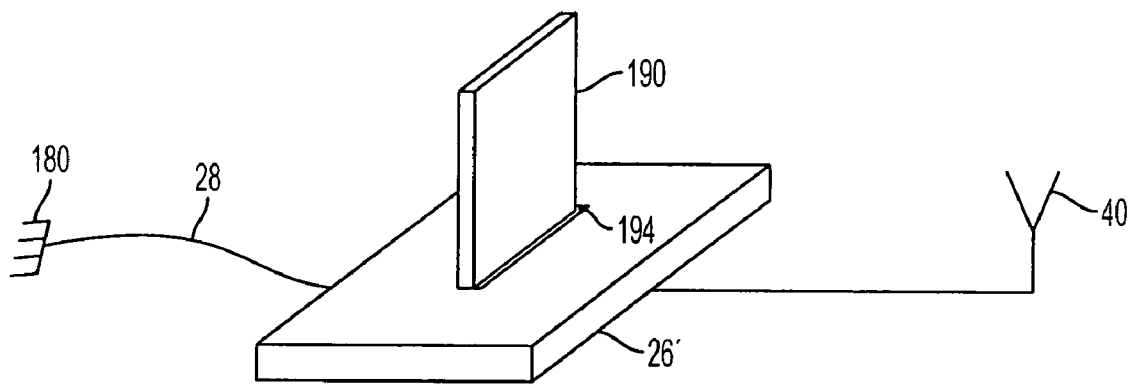
Figure 18:
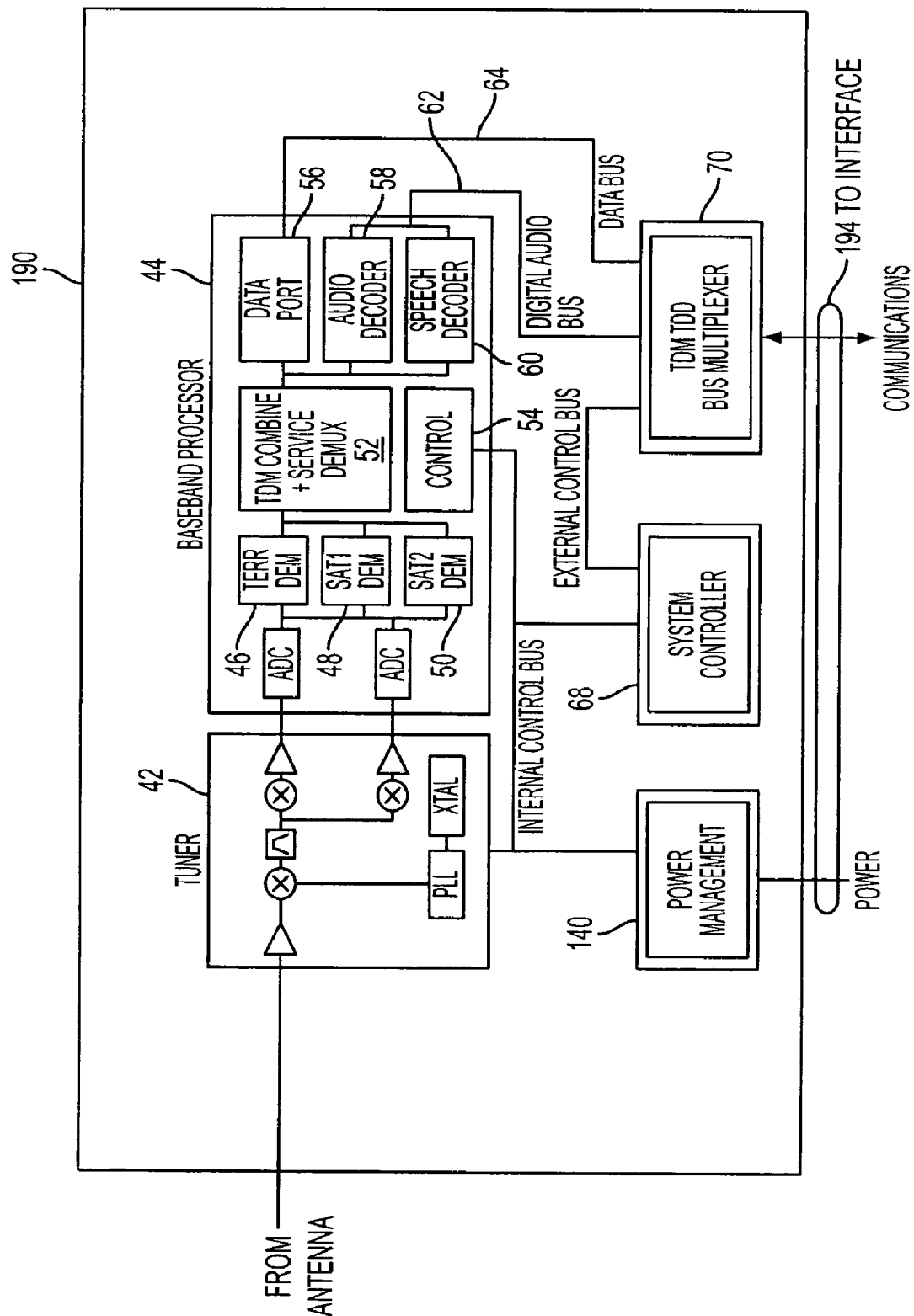

With reference to FIGS. 16, 17 and 18, a docking system 26' with SDARS subscription cartridge 190 is provided in accordance with an exemplary embodiment of the present invention. The docking station 26 can be connected to a standard SDARS antenna 40, as opposed to a digital antenna or an integrated antenna comprising an SDARS receiver and antenna in a single unit, as described in the above-referenced U.S. patent application Ser. No. 11/239,642. The docking station can be connected to an SDARS-compatible device via a cable 28 and connector 180, as described in connection with FIGS. 8A and 8B of the above-referenced U.S. patent application Ser. No. 11/239,642. The docking station comprises an interface or connector 194 for detachably connecting to a cartridge 190. As shown in FIG. 18, the cartridge 190 comprises similar components to those described in connection with FIG. 15. As stated above, the audio decoder 58 or system controller 68 of the cartridge 190 can implement one or more decoders for decoding different content formats such as WMA, AAC, AAC+, XMA and MP3, among others. The speech decoder 60 can be or can comprise an AMBE decoder. The system controller 68 is preferably provided with a software module for interfacing with the client application 34 in the PC 24 that provides the SDARS/digital jukebox functionality described above. The description of the remaining components is therefore omitted here for conciseness.

Figure 23:
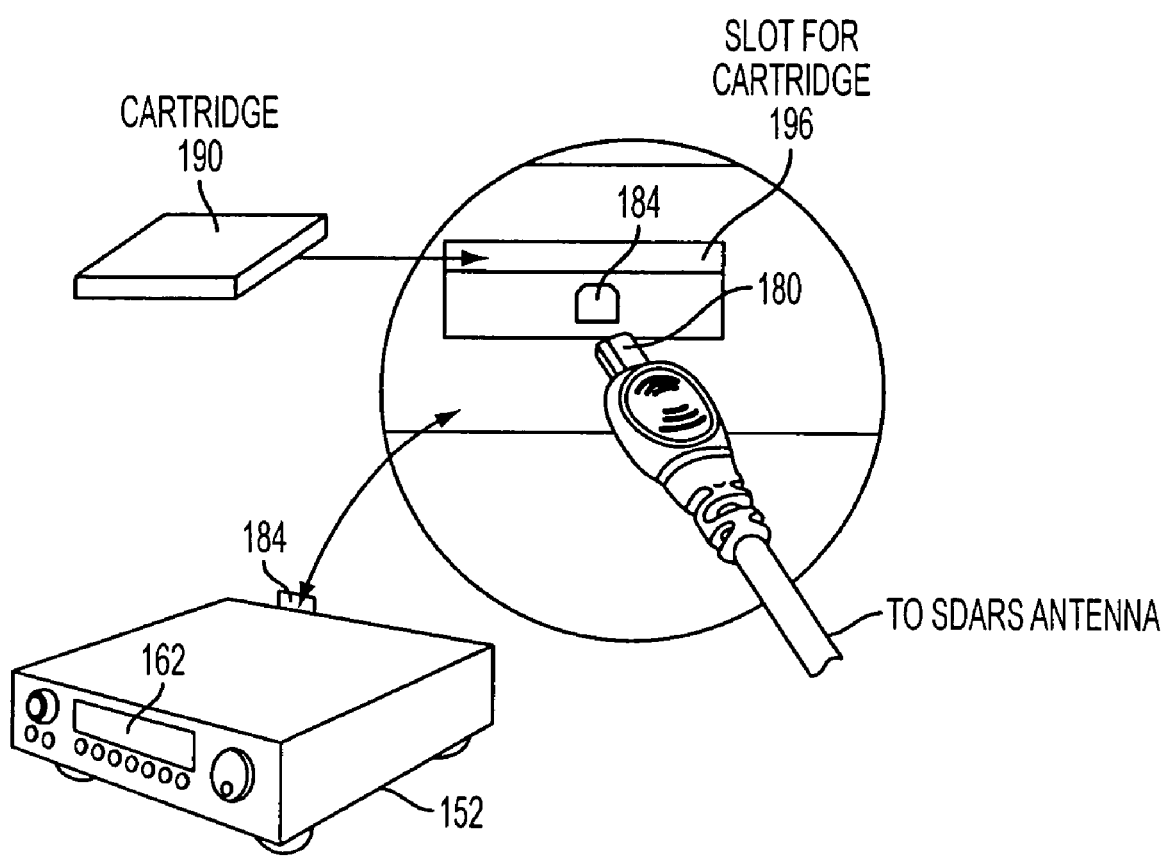
FIGS. 23 and 24 depict consumer equipment adapted to accept a cartridge according to an exemplary embodiment of the present invention.

As stated above, an interface 70 such as a time division multiplexing, time division duplexing (TDM TDD) bus multiplexer can be provided to facilitate interfacing the baseband processor 44 of the cartridge 190 to various external devices such as a player 22 (FIG. 15) or consumer equipment 152 (FIG. 23). As stated above, the cable connecting devices having respective DTICs 156 (e.g., which can be configured to implement bus multiplexers 70 in corresponding ones of two devices in communication with each other) preferably comprises two wires for power such as line power and ground wires, and two wires for supporting two-wire differential communications. Baseband processor 44 is illustrated as being connected to a TDM TDD bus multiplexer 70 via a data bus 64 and a digital audio bus 62. It is to be understood, however, that separate or discrete lines can be used to connect the baseband processor to the docking station via a cable.

Figure 19:
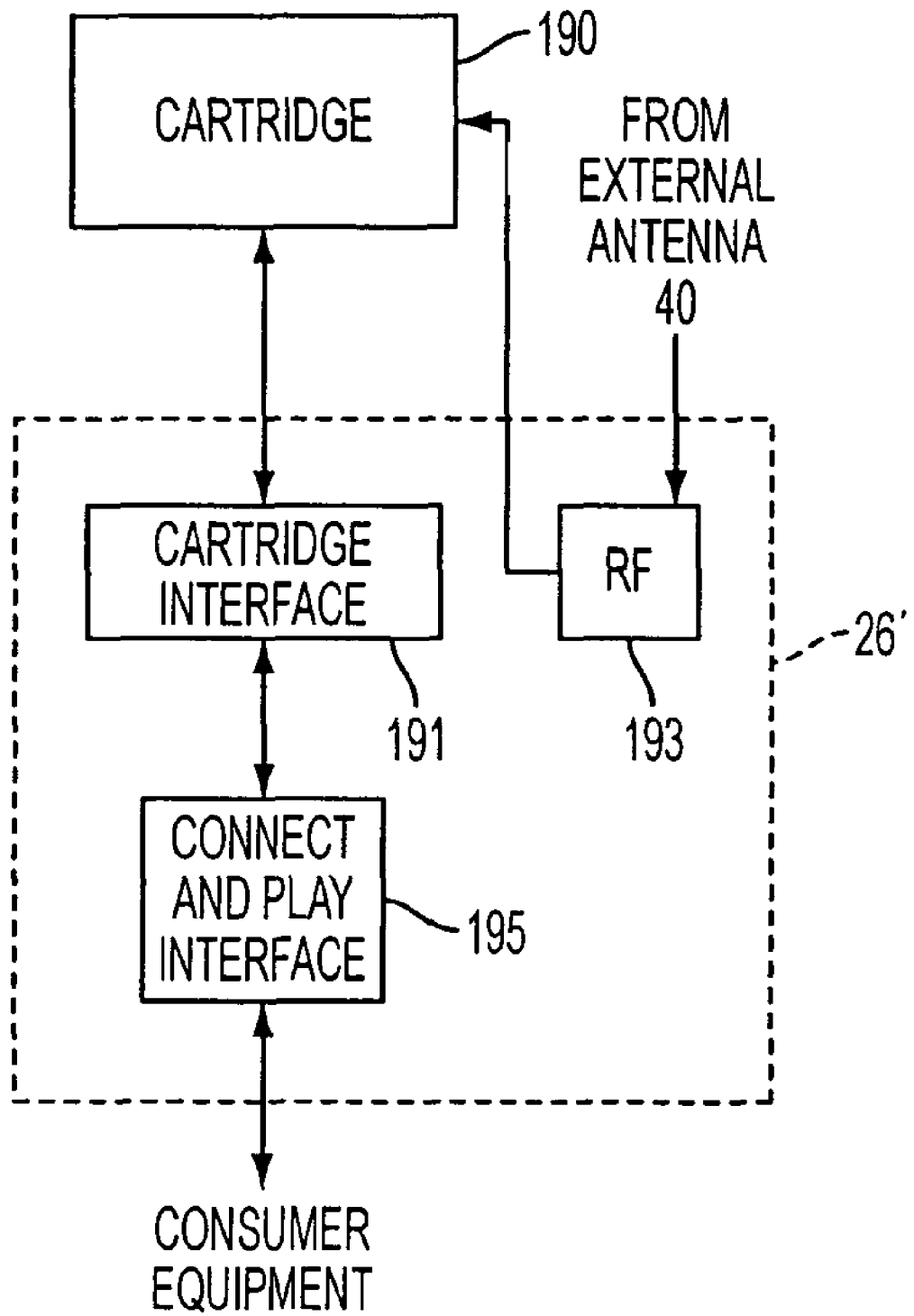
FIG. 19 is a block diagram of the docking station of FIGS. 16 and 17.

The docking station 26' (FIG. 19) for the configuration depicted in FIGS. 16 and 17 preferably operates as a wire pass-through to a device such as a consumer equipment 152 (e.g., a stereo receiver) shown in FIG. 23. The docking station 26' has a cartridge interface or connector 191 for electrically coupling the cartridge 190, when it is inserted in slot 194, to a connect and play interface 195. A four-wire cable extends from the connect and play interface 195 to the consumer equipment which preferably has a 4-prong or 4-socket connector to provide a DC voltage and ground to the cartridge 190, when inserted in slot 194, on two of the cable wires and to exchange communication signals with and receive SDARS content from the cartridge on the other two cable wires. An RF connector 193 is provided for providing signals from an external antenna 40 to the cartridge 190.

Figure 20:
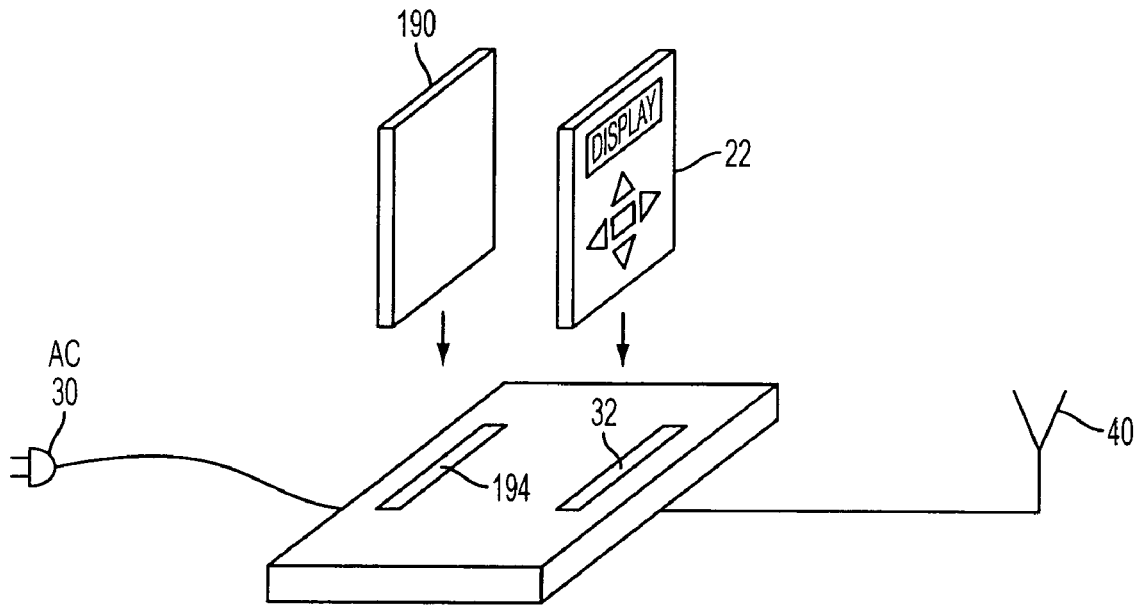
FIGS. 20 and 21 depict an SDARS player, docking station and cartridge according to an exemplary embodiment of the present invention.
Figure 21:
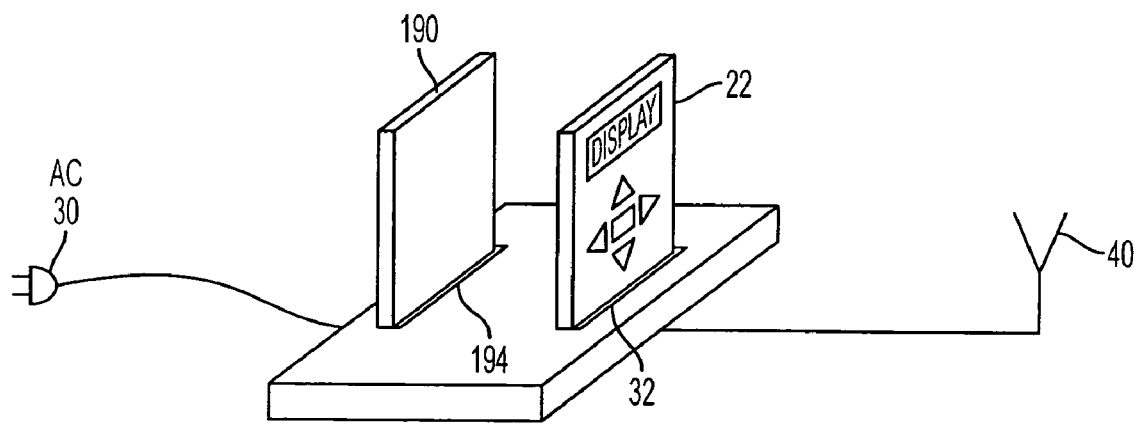
Figure 22:
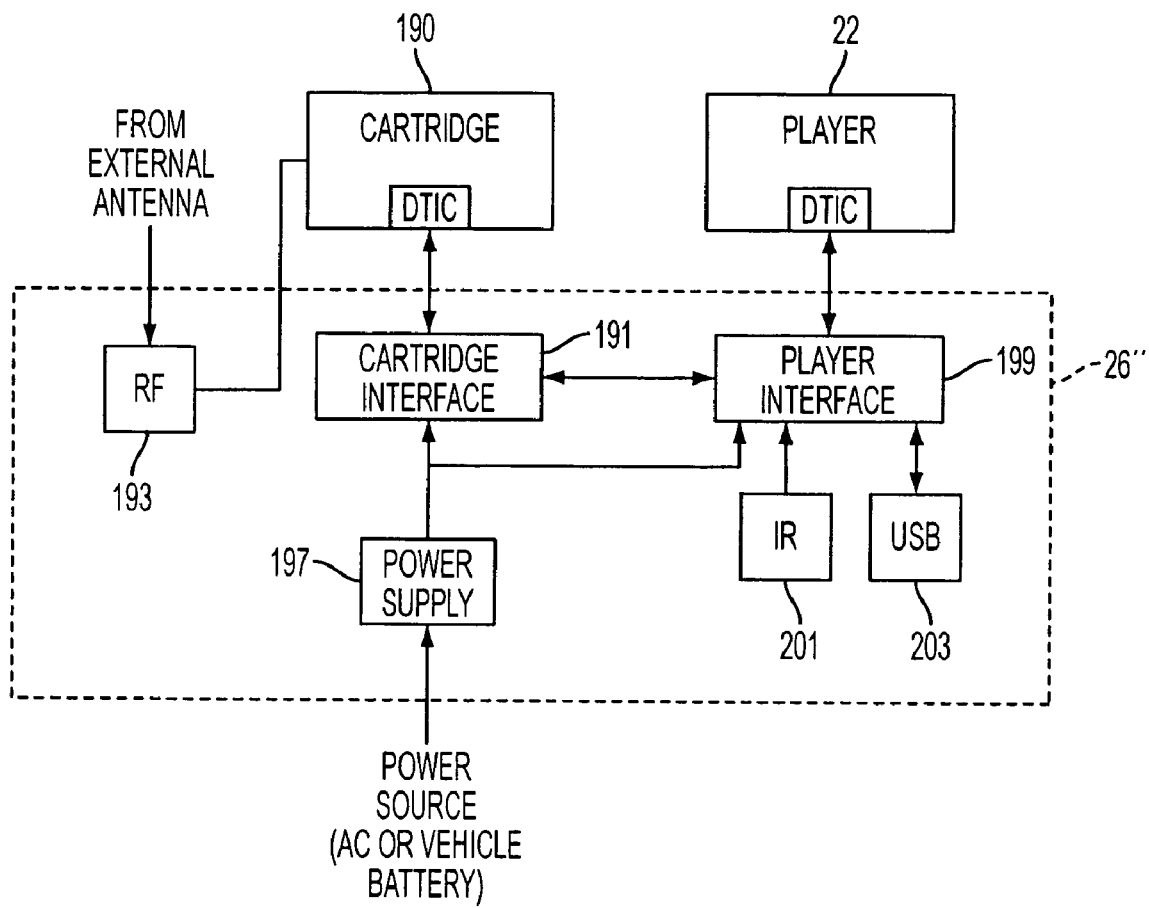
FIG. 22 is a block diagram of the SDARS player, docking station and cartridge of FIGS. 20 and 21.

FIGS. 20, 21 and 22 depict another cartridge 190 and docking station 26" configuration wherein a slot 32 is also provided to receive a player 22. As shown in FIG. 22, the docking station 26" comprises a player interface 199 for electrically connecting the player 22 to the cartridge 190 when the player and the cartridge are both inserted into their respective slots 194 and 32. The interfaces 191 and 199 are coupled, for example, via a two-wire link to allow differential communications between their respective DTICs 156 (e.g., TDM TDD bus multiplexers 70). A power supply 197 is provided to supply DC voltage and ground on two of the four wires extending from the interfaces 191 and 199 to their corresponding components, that is, the cartridge 190 and player 22, respectively. An IR interface 201 can be provided to receive IR commands for the player 22 when it is docked. The player 22 can be connected to another device, such as a PC, via the USB port 203.

Figure 24:
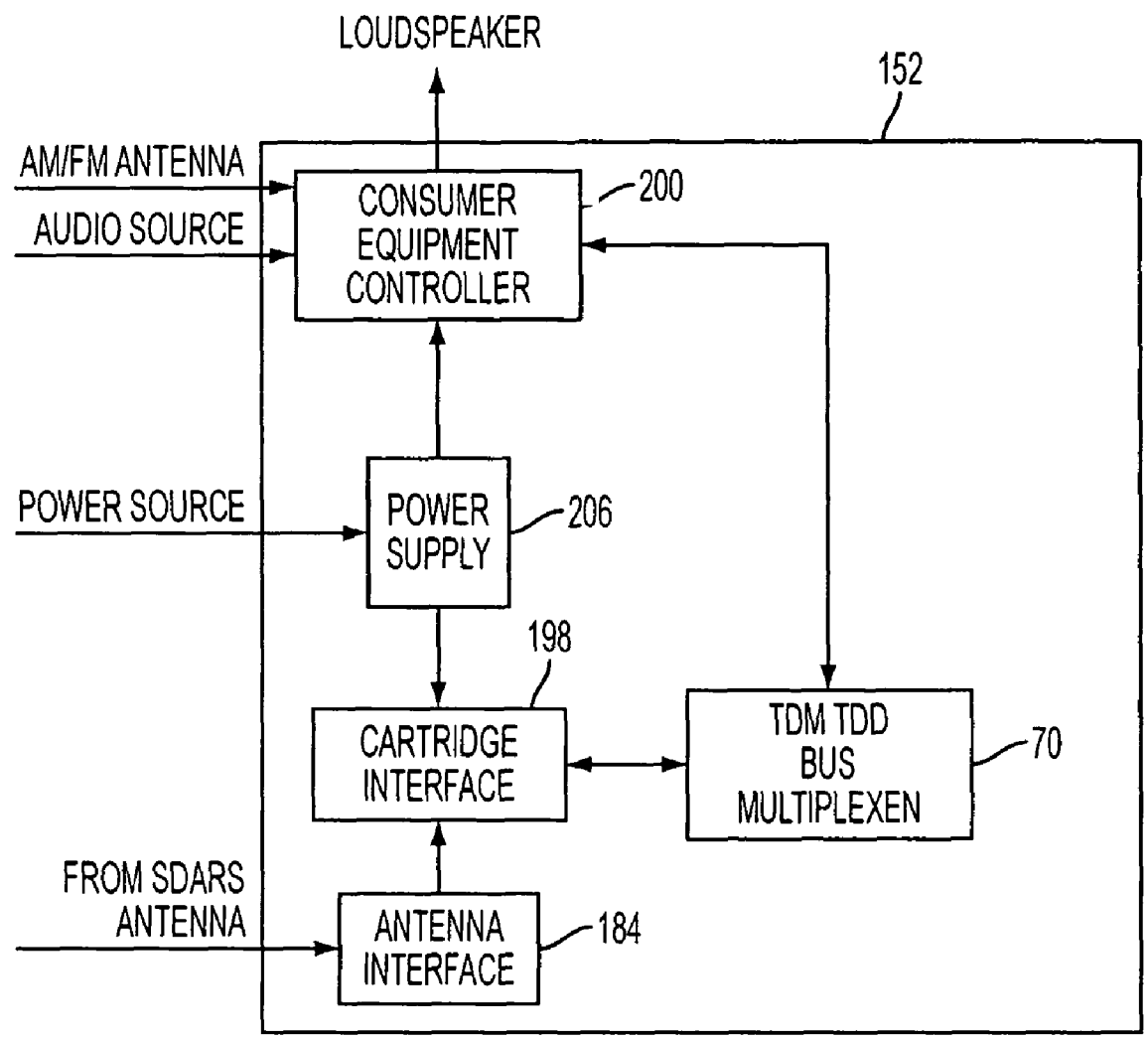
Figure 25A:
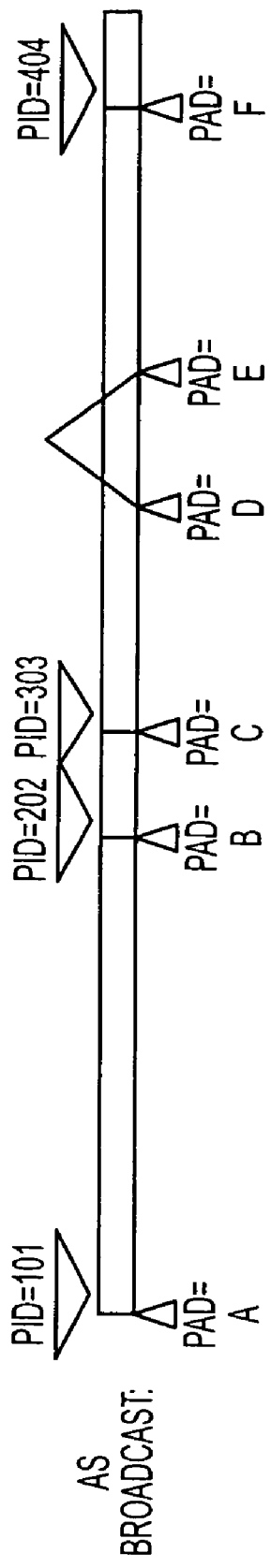
FIGS. 25 and 26 illustrate a method of extracting tracks from recorded sessions of SDARS content according to an exemplary embodiment of the present invention.
Figure 25B:
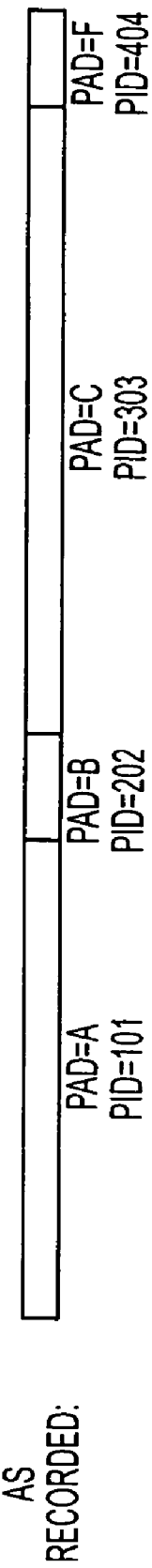

FIGS. 23 and 24 illustrate an exemplary consumer equipment (CE) 152 that is configured with a slot 196 to receive a cartridge 190 and has a connect and play interface 184. The CE 152 comprises a cartridge interface 198 therein that is electrically coupled to a DTIC (e.g., a TDM TDD bus multiplexer 70). When a cartridge 190 is in the slot 196, the cartridge 190 communicates digital audio and commands to the TDM TDD bus multiplexer 70 via a two-wire link, for example, and the TDM TDD bus multiplexer 70, in turn, that provides digital audio and commands to a controller 200 to playback SDARS programming via a loudspeaker. A power supply 206 provides power to the cartridge 190 via the interface 198. The connect and play interface 184 receives an input from an external SDARS antenna and provides it to the cartridge 190 via the cartridge interface 198.

Digital Rights Management

SDARS Digital Rights Management (SDARS DRM) for player devices will now be described in accordance with an exemplary embodiment of the present invention. SDARS DRM is preferably implemented via a management system which has been developed to control the recording and playback of SDARS content. The SDARS DRM system of the present invention preferably serves four main purposes as follows:

1. All recorded XM content is preferably protected from being able to be removed from the device 22. For example, file control attributes are transmitted over the air or on line with the SDARS signal that control the device 22 to disregard user attempts to remove recorded SDARS content.

2. Parameters such as restriction parameters can be transmitted with the SDARS content (e.g., over the air or on line) that can restrict recordings of channels, programs, or individual songs.

3. The device 22 is programmed to verify that the user subscription is valid in order for recorded content to continue to play (e.g., by receiving activation bits from the SDARS receiver 154 or Connect and Play Antenna that were provided to the SDARS receiver 154 or Connect and Play Antenna during activation).

4. Properties of the XM recorded content including the playback lifetime and content organization capabilities can be changed by additional over the air parameters.

File Containment

Player devices 22 do not enable unencrypted SDARS content to be stored on a removable storage media or to be transferred from the embedded storage media in accordance with an exemplary embodiment of the present invention. Preferably only SDARS Program Associated Data (PAD) such as the artist name, song, program ID and category may be transferred from the embedded storage media.

If the player 22 provides visibility of stored metadata (media PAD data) and other attributes to external devices (such as a connected PC) in the form of an attribute file associated with each stored media file, the attribute file preferably conforms to the SDARS Media File format described above. The SDARS Media Files exposed by the player 22 do not include the actual recorded audio content in accordance with an exemplary embodiment of the present invention.

Installing Firmware Update

In accordance with an exemplary embodiment of the present invention, upon detection of the Update Firmware command in the SDARS Directive File during power-up, the Device 22 can locate the referenced SDARS Device Firmware Update File in the xmsys folder of the Public Content and Data Exchange Data Partition 82 and, if present, verify the CRC of the file. If the firmware version is greater than or equal to the installed firmware version, the Device 22 installs the firmware, deletes the SDARS Device Firmware Update File, and reboots.

Extracting Tracks Based on Changes in PID/PAD Data

Figure 26A:
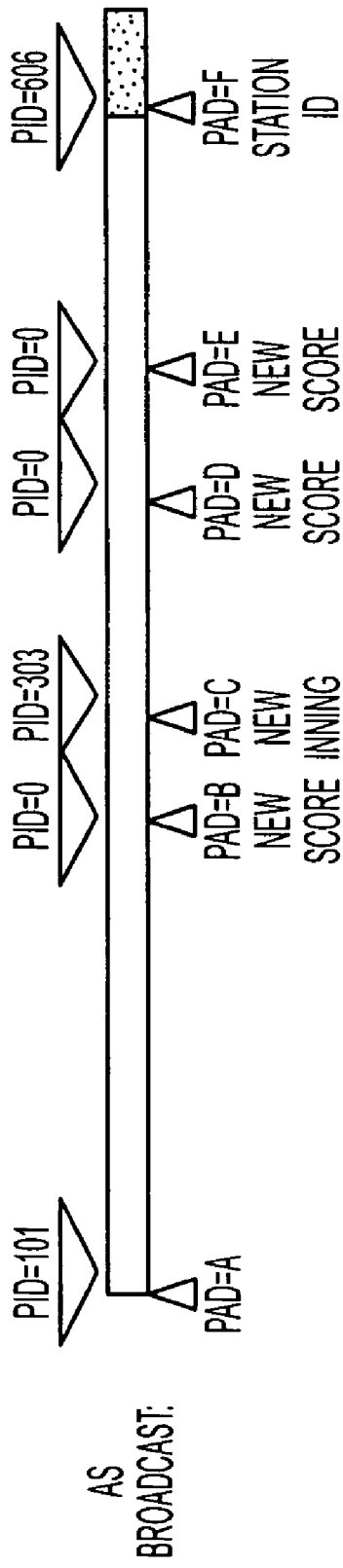
Figure 26B:
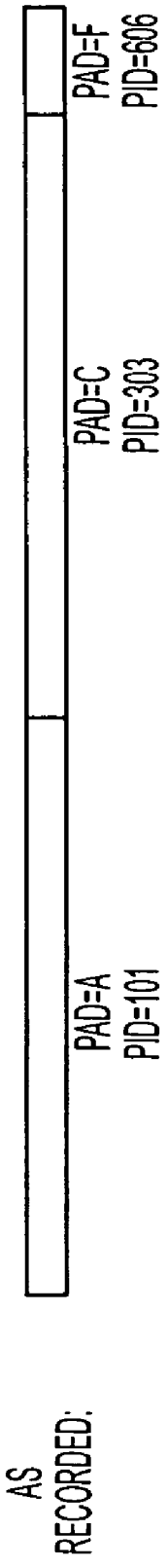

FIGS. 26A, 26B, 27A and 27B—illustrate a method of splitting tracks within a single recorded session of SDARS content in accordance with an exemplary embodiment of the present invention. FIGS. 26A and 26B illustrate a method of determining appropriate split points for songs with segments of "DJ speak" in between. A track is a single contiguous file stored in the SDARS player memory. Interstitial content, such as station identifications, announcements and DJ banter between songs is preferably not captured within tracks. SDARS content is transmitted with Program ID data and PAD data. The PAD data typically contains text such as the artist name and song name. However, as shown in FIG. 26A it is possible for the PAD data to change during a song. Changes in PAD data without a corresponding change in the PID are preferably ignored. Thus, as illustrated in FIG. 26B, song "C" is recorded as a single track, with the correct title and artist data.

As shown in FIG. 27, the PID can be used to identify the beginning of a new track in a sporting event. For example, in a baseball telecast, it may be beneficial to record each inning as a separate track. In the meanwhile, PAD data changes to reflect changes in the score. In one embodiment, when the score changes and PAD data correspondingly changes, and internal PID of 0 is used. The PID=0 is recast as the previous PID so that the SDARS Device never sees a change in the PID. In this manner, the SDARS Device separates tracks when it sees a PID change, that is, at breaks between innings of the baseball game. Alternately, PID=0 could be transmitted to the SDARS Device, but ignored by the SDARS Device until a PID change to a non-zero value is recognized.

Exemplary embodiments of the present invention have been described with reference to a player 22, PC 24, controller (e.g., player controller 122), web server, online music infrastructure, and so one. It is to be understood, however, that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While the invention herein disclosed has been described by means of specific embodiments and applications thereof, numerous modifications and variations can be made thereto by those skilled in the art without departing from the scope of the invention.

What is claimed is:

1. A portable player comprising:
a receiver for receiving a satellite digital audio radio service (SDARS) signal comprising a plurality of channels, each of the channels comprising tracks;
a memory device configured to store at least selected ones of the tracks, and media files obtained from another source;
a computer interface comprising a client application for use with a computer; and
a processing device connected to the memory device and the receiver and programmable to communicate with the computer interface to allow a user to organize the stored tracks and the stored media files for selective playback while preventing unauthorized transfer of the stored tracks from the player to another device for storage.

2. A portable player as claimed in claim 1, wherein the computer interface is configured to generate screens on a display device connected to the computer for providing lists of the stored tracks and the stored media files, and the client application is programmed generate playlists comprising different ones of the stored tracks and the stored media files selected by a user for playback via responses that were entered via the computer interface to prompts on the screens.

3. A portable player as claimed in claim 1, further comprising a user interface connected to the processing device, wherein the processing device is programmed to generate screens on a display device on the player for providing lists of the stored tracks and the stored media files, and to generate playlists comprising different ones of the stored tracks and the stored media files selected by a user for playback via responses that were entered via the user interface to prompts on the screens.

4. A portable player as claimed in claim 3, wherein the computer interface is configured to generate screens on a display device connected to the computer for providing lists of the stored tracks and the stored media files, and the client application is programmed generate playlists comprising different ones of the stored tracks and the stored media files selected by a user for playback via responses that were entered via the computer interface to prompts on the screens.

5. A portable player as claimed in claim 4, wherein the processing device and the client application can synchronize stored data comprising lists of the stored tracks and the stored media files, and at least one of playlists and user preferences entered via responses to the prompts on the screens on the player and the computer that were entered via the user interface and the computer interface, respectively.

6. A portable player as claimed in claim 1, wherein the computer interface is configured to generate screens on a display device connected to the computer for selectively displaying the channels and the tracks being played on the channels.

7. A portable player as claimed in claim 1, further comprising a player display device, wherein the processing device is operable to generate screens on the player display device having menu options to allow a user to select preferred tracks, the processing device being programmed to locate the preferred tracks as they are received in the SDARS signal and generate an indication to the user as they are received.

8. A portable player as claimed in claim 7, wherein the menu options allow a user to select preferred tracks by at least one of artist name and track title.

9. A portable player as claimed in claim 1, wherein the processing device is operable to write over the stored tracks in the memory device, the player further comprising a player user interface device coupled to the processing device for selectively locking and unlocking stored tracks, the processing device not being able to write over the stored tracks that are locked.

10. A portable player as claimed in claim 1, wherein the memory device comprises a private content partition for storing selected ones of the tracks, the processing device being configured to prevent the computer from accessing the tracks stored in the private content partition.

11. A portable player as claimed in claim 10, wherein the memory device comprises a data exchange partition for storing data exchange files that can be exchanged between the player and the computer.

12. A portable player as claimed in claim 11, wherein one of the data exchange files is an SDARS media file to represent a stored track comprising data relating to the stored track selected from the group consisting of channel information for the channel on which the stored track was received, track identification information, information relating to when the stored track was broadcast, session information relating to the session in which the stored track was recorded, and recording quality information.

13. A portable player as claimed in claim 12, wherein the SDARS media file comprises tag-length-value encoding.

14. A portable player as claimed in claim 12, wherein the SDARS media file comprises ID3 tags.

15. A portable player as claimed in claim 11, wherein one of the data exchange files is an SDARS media file to represent a stored track comprising data relating to the stored track but not the actual content of the stored track.

16. A portable player as claimed in claim 11, wherein one of the data exchange files is an SDARS media file to represent a stored track comprising data relating to the stored track and at least one of encrypted content and compressed content of the stored track.

17. A portable player as claimed in claim 1, wherein the memory device comprises a public content partition for storing the media files so as to be accessible by the computer.

18. A portable player as claimed in claim 1, further comprising a user interface for selecting a bookmark operation, wherein the processing device is programmable to identify at least one of a track in the SDARS signal being received and a stored track for authorized acquisition in response to selection of the bookmark operation via the user interface.

19. A portable player as claimed in claim 18, wherein the player is operable to generate a bookmark file in response to the selection of the bookmark operation via the user interface, the bookmark file comprising a first set of data for a stored track and a second set of data for a track that was subject to the bookmark operation during reception of the SDARS signal but not selected for storage as a stored track in the memory device.

20. A portable player as claimed in claim 1, wherein a stored track is a SDARS media file comprising track data that represents SDARS content corresponding to the track.

21. A portable player as claimed in claim 20, wherein the track data facilitates authorized acquisition of the SDARS content corresponding to the stored track.

22. A portable player as claimed in claim 20, wherein the SDARS media file comprises at least one of an encrypted version and a compressed version of the SDARS content corresponding to the stored track.

23. A portable player as claimed in claim 20, wherein the track data in the SDARS media file comprises a session identifier indicating when the portable player stored the stored track in the memory device.

24. A portable player as claimed in claim 20, wherein the track data in the SDARS media file further comprises recording quality data indicating the recording quality of the stored track.

25. A portable player as claimed in claim 24, wherein the recording quality data comprises a truncation indicator for indicating whether the recording of the stored track for storage in the memory device was complete or truncated.

26. A portable player as claimed in claim 20, wherein the track data in the SDARS media file further comprises data selected from the group consisting of artist label for the stored track, title of the stored track, number of channel over which the track was broadcast, channel name, channel category name, program identifier, time and date the stored track was captured by the memory device.

27. A portable player as claimed in claim 20, wherein the SDARS media file comprises tag-length-value encoding.

28. A portable player as claimed in claim 20, wherein the SDARS media file comprises ID3 tags.

29. A portable player as claimed in claim 1, wherein at least one of the player and the computer has a display device, and wherein the SDARS signal comprises recorded sessions, the recorded sessions comprise a plurality of tracks and other components and session data to distinguish the different tracks and other components within the session, at least one of the client application and the processing device being programmed to use the session data to filter a session received via the SDARS signal to not display selected ones of the components as a stored track.

30. A portable player as claimed in claim 1, wherein the processing device is operable to perform at least one of two operations comprising processing parameters received with the SDARS signal to prevent unauthorized transfer of stored tracks from the player to another device for storage, and processing parameters received via the receiver during activation to verify a valid user subscription for SDARS before allowing at least one of the stored tracks to continue to play.

31. A portable player as claimed in claim 1, wherein the player is configured to receive parameters for controlling the player to restrict at least one of recording of a selected channel, recording of a selected program, recording of a selected track, playback of a selected track from the memory device after an expiration date, and content organization functions of the player.

32. A portable player as claimed in claim 1, wherein the player comprises a display and a plurality of user buttons, the processing device being operable to selectively orient screens generated on the display and to selectively assign functions to the user buttons depending on whether the player is used as a portable handheld device or docked using a cradle.

33. A portable player as claimed in claim 1, wherein the player comprises a display, the processing device being operable to generate a message on the display to indicate when the user is listening to the SDARS signal being received, or to the stored tracks and the stored media files.

34. A method of operating a portable player comprising:
receiving and selectively playing back a satellite digital audio radio service (SDARS) signal comprising a plurality of channels, each of the channels comprising tracks;
storing at least selected ones of the tracks and media files obtained from another source; and
organizing the stored tracks and the stored media files for selective playback in lieu of the received SDARS signal while preventing unauthorized transfer of the stored tracks from the player to another device for storage.

35. The method of claim 34, further comprising:
generating screens on a display device on the player that provide lists of the stored tracks and the stored media files;
generating playlists comprising different ones of the stored tracks and the stored media files according to user responses to prompts on the screens.

36. The method of claim 35, further comprising:
connecting the player to a computer;
configuring the computer to receive and selectively play back the SDARS signal, store at least selected ones of the tracks and media files obtained from another source, and organize the stored tracks and the stored media files for selective playback in lieu of the received SDARS signal; and
synchronizing stored data on the player and the computer comprising lists of the stored tracks and the stored media files, and at least one of playlists and user preferences entered via the player and the computer, respectively.

37. The method of claim 34, further comprising
generating screens on a player display device having menu options to allow a user to select preferred tracks;
locating the preferred tracks as they are received in the SDARS signal; and
generating an indication to the user as they are received.

38. The method of claim 37, wherein the menu options allow a user to select preferred tracks by at least one of artist name and track title.

39. The method of claim 34, wherein the player is operable to write over the stored tracks, the method comprising selectively locking and unlocking the stored tracks, the player not being operable to write over the stored tracks that are locked.

40. The method of claim 34, further comprising:
connecting the player to a computer; and
storing selected ones of the tracks in a private content partition of memory; and
preventing the computer from accessing the tracks stored in the private content partition.

41. The method of claim 40, further comprising maintaining a data exchange partition in memory for storing data exchange files that can be exchanged between the player and the computer.

42. The method of claim 41, wherein one of the data exchange files is an SDARS media file to represent a stored track comprising data relating to the stored track selected from the group consisting of channel information for the channel on which the stored track was received, track identification information, information relating to when the stored track was broadcast, session information relating to the session in which the stored track was recorded, and recording quality information.

43. The method of claim 42, wherein the SDARS media file comprises tag-length-value encoding.

44. The method of claim 42, wherein the SDARS media file comprises ID3 tags.

45. The method of claim 41, wherein one of the data exchange files is an SDARS media file to represent a stored track comprising data relating to the stored track but not the actual content of the stored track.

46. The method of claim 41, wherein one of the data exchange files is an SDARS media file to represent a stored track comprising data relating to the stored track and at least one of encrypted content and compressed content of the stored track.

47. The method of claim 34, further comprising:
connecting the player to a computer; and
storing selected ones of the tracks in a public content partition of memory for storing the media files so as to be accessible by the computer.

48. The method of claim 34, further comprising operating a user input on the player to select a bookmark operation to identify at least one of a track in the SDARS signal being received and a stored track for authorized acquisition.

49. The method of claim 34, further comprising generating an SDARS media file for a stored track having track data that represents SDARS content corresponding to the track.

50. The method of claim 49, wherein the track data facilitates authorized acquisition of the SDARS content corresponding to the stored track.

51. The method of claim 49, wherein the SDARS media file comprises at least one of an encrypted version and a compressed version of the SDARS content corresponding to the stored track.

52. The method of claim 49, wherein the track data in the SDARS media file comprises a session identifier indicating when the portable player stored the stored track in the memory device.

53. The method of claim 49, wherein the track data in the SDARS media file further comprises recording quality data indicating the recording quality of the stored track.

54. The method of claim 53, wherein the recording quality data comprises a truncation indicator for indicating whether the recording of the stored track for storage in the memory device was complete or truncated.

55. The method of claim 49, wherein the track data in the SDARS media file further comprises data selected from the group consisting of artist label for the stored track, title of the stored track, number of channel over which the track was broadcast, channel name, channel category name, program identifier, time and date the stored track was captured by the memory device.

56. The method of claim 49, wherein the SDARS media file comprises tag-length-value encoding.

57. The method of claim 49, wherein the SDARS media file comprises ID3 tags.

58. The method of claim 34, wherein the SDARS signal comprises recorded sessions and the recorded sessions comprise a plurality of tracks and other components and session data to distinguish the different tracks and other components within the session, the method further comprising using the session data to filter a session received via the SDARS signal to not display selected ones of the components as a stored track to a user.

59. The method of claim 34, further comprising enforcing restrictions for storage of the stored tracks by performing at least one of two operations comprising processing parameters received with the SDARS signal to unauthorized transfer of stored tracks from the player to another device for storage, and processing parameters received via the receiver during activation to verify a valid user subscription for SDARS before allowing at least one of the stored tracks to continue to play.

60. The method of claim 34, further comprising receiving parameters for controlling the player to restrict at least one of recording of a selected channel, recording of a selected program, recording of a selected track, playback of a selected track from the memory device after an expiration date, and content organization functions of the player.

61. The method of claim 34, wherein the player comprises a display and a plurality of user buttons, the method further comprising selectively orienting screens generated on the display and selectively assigning functions to the user buttons depending on whether the player is used as a portable handheld device or docked using a cradle.

62. The method of claim 34, further comprising indicating when the user is listening to the SDARS signal being received, or to the stored tracks and the stored media files.

* * * * *